US006850353B1

(12) United States Patent
Chiao

(10) Patent No.: US 6,850,353 B1
(45) Date of Patent: Feb. 1, 2005

(54) MEMS OPTICAL COMPONENTS

(75) Inventor: Jung-Chih Chiao, Arlington, TX (US)

(73) Assignee: University of Hawaii, Honolulu, HI (US)

( * ) Notice: Subject to any disclaimer, the term of this patent is extended or adjusted under 35 U.S.C. 154(b) by 0 days.

(21) Appl. No.: 10/312,676
(22) PCT Filed: Jun. 1, 2000
(86) PCT No.: PCT/US00/24174
    § 371 (c)(1),
    (2), (4) Date: May 12, 2003
(87) PCT Pub. No.: WO01/96928
    PCT Pub. Date: Dec. 20, 2001

Related U.S. Application Data
(60) Provisional application No. 60/173,659, filed on Dec. 30, 1999, and provisional application No. 60/138,865, filed on Jun. 11, 1999.

(51) Int. Cl.[7] .............................. G02B 26/00; G02B 6/00
(52) U.S. Cl. ....................................... 359/290; 385/140
(58) Field of Search ......................... 250/233.1, 233.11, 250/231.11; 359/230, 290, 291; 385/140

(56) References Cited

U.S. PATENT DOCUMENTS

| | | | |
|---|---|---|---|
| 3,574,438 A | 4/1971 | Carson | |
| 3,576,579 A | 4/1971 | Applebaum | |
| 3,708,796 A | 1/1973 | Gilbert | |
| 5,047,783 A | 9/1991 | Hugenin | |
| 5,119,454 A | 6/1992 | McMahon | |
| 5,170,169 A | 12/1992 | Stephan | |
| 5,412,186 A | 5/1995 | Gale | |
| 5,485,304 A | 1/1996 | Kaeriyama | |
| 5,512,374 A | 4/1996 | Wallace et al. | |
| 5,646,768 A | 7/1997 | Kaeriyama | |
| 5,706,123 A | 1/1998 | Miller et al. | |
| 5,768,007 A | 6/1998 | Knipe et al. | |
| 5,835,256 A | 11/1998 | Huibers | |
| 5,867,297 A | 2/1999 | Kiang et al. | |
| 5,903,393 A | 5/1999 | Kalibjian | |
| 5,903,687 A | * 5/1999 | Young et al. | .................. 385/17 |
| 5,982,326 A | 11/1999 | Chow et al. | |
| 5,994,159 A | 11/1999 | Aksyut et al. | |

(List continued on next page.)

FOREIGN PATENT DOCUMENTS

| | | | |
|---|---|---|---|
| WO | WO 00/77543 A1 | * 12/2000 | ........... G01S/13/89 |
| WO | WO 00/77556 A1 | * 12/2000 | ........... G02B/26/00 |
| WO | WO 00/77877 A1 | 12/2000 | |
| WO | WO 01/96928 A1 | * 12/2001 | ........... G02B/26/00 |

OTHER PUBLICATIONS

Akiyama, et al., "Controlled Stepwise Motion in Polysilicon Microsructures", *J. of MEMS*, Sep. 1993; 2 (3): 106.

Akiyama, T. et al., "A Quantitative Analysis of Scratch Drive Actuator Using Buckling Motion", *IEEE Micro Electro Mechanical Networks*, 1995, pp. 310–315.

Fan, L., et al., "IC Processed Electrostatic Micromotors", *Sensors and Actuators*, Nov. 1989, vol. 20, pp. 41–47.

Tang, W., et al. "Laterally Driven Polysilicon Resonant Microstructures", *Sensors and Actuators*, Nov. 1989, vol. 20, pp. 25.

*Primary Examiner*—David N. Spector
(74) *Attorney, Agent, or Firm*—Dorsey & Whitney LLP

(57) ABSTRACT

An optical network, an optical device, and one or more MEMS optical components are disclosed. The optical network comprises one or more optical input sources, one or more optical output collectors, and the optical device. The optical device is optically coupled between the one or more optical input sources and the one or more optical output collectors. The optical device is formed on a intergrated MEMS chip. The optical device comprises the one or more MEMS optical components formed on the integrated MEMS chip. In fact, each MEMS optical component may be monolithically fabricated on, self assemblable on, and reconfigurable or moveable on the integrated MEMS chip.

5 Claims, 34 Drawing Sheets

U.S. PATENT DOCUMENTS

| | | |
|---|---|---|
| 5,995,688 A | 11/1999 | Aksyuk et al. |
| 6,034,807 A | 3/2000 | Little et al. |
| 6,046,840 A | 4/2000 | Huibers |
| 6,101,371 A | 8/2000 | Barber et al. |
| 6,163,643 A * | 12/2000 | Bergmann et al. .......... 385/140 |
| 6,275,320 B1 * | 8/2001 | Dhuler et al. ............... 359/237 |
| 2002/0110347 A1 * | 8/2002 | Morimoto et al. .......... 385/140 |
| 2003/0053743 A1 * | 3/2003 | Liu et al. ...................... 385/18 |

* cited by examiner

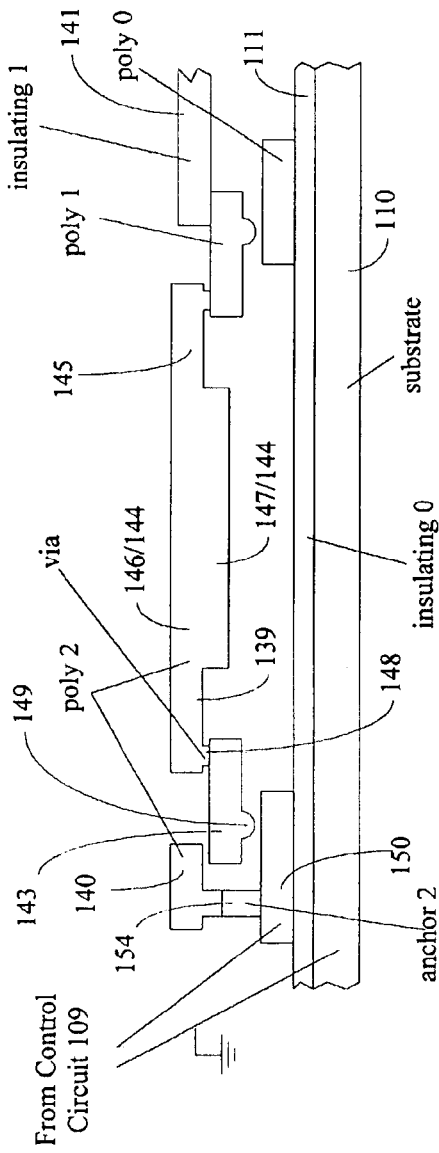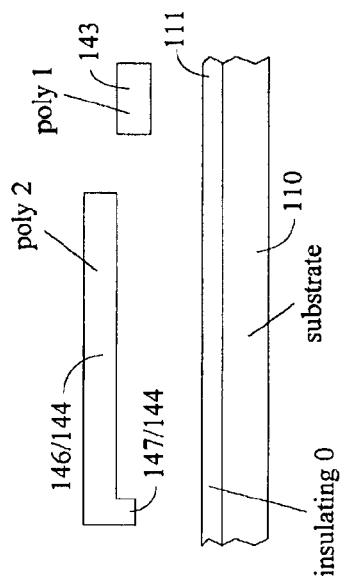
Fig. 15
Fig. 16

MEMS OPTICAL COMPONENTS

CROSS REFERENCE TO RELATED APPLICATIONS

This application is a U.S. National Stage Application filed under 35 U.S.C. §371 of PCT patent application serial no. US00/24174 filed on Sep. 1, 2000, which claims priority to PCT patent application serial no. US00/16023 filed on Jun. 9, 2000, which claims the benefit of U.S. provisional patent application Ser. Nos. 60/138,865 filed Jun. 11, 1999 and 60/173,659 filed Dec. 30, 1999, the disclosures of which are hereby incorporated by reference. This patent application is related to copending PCT Patent Applications Ser. Nos. PCT/US00/16021 and PCT/US00/16024, with respective titles MEMS TRANSMISSION AND CIRCUIT COMPONENTS and RECONFIGURABLE QUASI-OPTICAL UNIT CELLS, and filed on Jun. 9, 2000. These copending applications are hereby incorporated by reference.

TECHNICAL FIELD OF THE INVENTION

The present invention relates generally to optical networks. In particular, the present invention pertains to MEMS (micro-electro-mechanical system) optical components that are integrated together on an integrated MEMS chip to form an optical device used in an optical network. These MEMS optical components are monolithically fabricated on the chip, self assemblable on the chip, and, in some cases, reconfigurable or moveable on the chip.

BACKGROUND OF THE INVENTION

Optical communication using WDM (wavelength-division-multiplexing) techniques is a very attractive and economical solution for the bandwidth needs expected for Internet, video, and multimedia services. The broadband feature of optical communication provides transparency in optical networks where optical signals can carry independent signal formats without interference. For example, in the same optical fiber at the same time, a first carrier signal with wavelength $\lambda_1$ (i.e., channel 1) could carry analog frequency multiplexed signals, a second carrier signal with wavelength $\gamma_2$ (i.e., channel 2) could carry a 2.5-Gb/s (OC-48) digital signal, and a third carrier signal with wavelength $\lambda_3$ (i.e., channel 3) could carry a 155-Mb/s (OC-3) digital signal. This transparency provides cost reduction, survivability, security, and/or flexibility of the optical networks. Specifically, optical signals can be routed dynamically in or between networks to avoid interruption of services and highly secured or emergency data can reach destinations without interrupting other communication services. Transparency also provides management flexibility to optimize the traffic and bandwidth allocation in optical networks. Furthermore, transparency enables the capacity of optical networks to be greatly increased without significantly increasing costs since existing underground or undersea fiber optic cables can be used.

To achieve such transparency in such optical networks, the optical networks comprise various optical devices, such as WDM multiplexers, switches, filter systems, wavemeters, power regulators, and/or attenuators. These optical devices may themselves comprise optical components, such as gate filters, thin film filters, Fresnel lenses, refractive lenses, grating mirrors, reflective mirrors, and/or tuning plates. However, conventional optical components of the type just described are bulky, cannot be monolithically fabricated, and require manual assembly for proper optical alignment.

In view of the foregoing, there is a need for monolithically fabricated, on-chip assemblable, MEMS optical components. These optical components would be integrated together on an integrated MEMS chip to form an optical device of an optical network.

BRIEF DESCRIPTION OF THE DRAWINGS

FIGS. 14 to 16 show the configuration of the actuator mechanism of the element structure assembly of the lens/filter optical component of FIGS. 2 to 4.

SUMMARY OF THE INVENTION

In summary, the present invention comprises an optical network, an optical device, and one or more MEMS optical components. The optical network comprises one or more optical input sources, one or more optical output collectors, and the optical device. The optical device is optically coupled between the one or more optical input sources and the one or more optical output collectors. The optical device is formed on a integrated MEMS chip that is oriented in a horizontal plane. The optical device comprises the one or more MEMS optical components formed on the chip. In fact, each MEMS optical component may be monolithically fabricated on the chip.

In one embodiment, each MEMS optical component comprises an element structure assembly. The element structure assembly comprises a corresponding actuator mechanism formed on the chip. The corresponding actuator mechanism is configured to be controllably moved laterally with respect to the chip. The element structure assembly also comprises an element structure pivotally coupled to the chip and moveably coupled to the corresponding actuator mechanism. The element structure has a lying position generally parallel to the horizontal plane and an upright position generally perpendicular to the horizontal plane. The element structure comprises an optical element that is configured to optically interact with an input light beam when in the upright position. When the corresponding actuator is controlled to move laterally, the element structure pivots so as to move from the lying position to the upright position so that the optical element can optically interact with the input light beam.

In another embodiment, each MEMS optical component comprises a moveable stage assembly. The moveable stage assembly comprises an actuator mechanism and a moveable stage both formed on the integrated MEMS chip. The actuator mechanism is configured to be controlled to move on the integrated MEMS chip. The moveable stage is fixedly coupled to the actuator mechanism and configured to be moved on the integrated MEMS chip. Each MEMS optical component further comprises an element structure coupled to the moveable stage. The element structure comprises an optical element. When the actuator mechanism is controlled to move, the moveable stage moves the element structure.

DETAILED DESCRIPTION OF THE INVENTION

First Exemplary Embodiment

Figure 1:
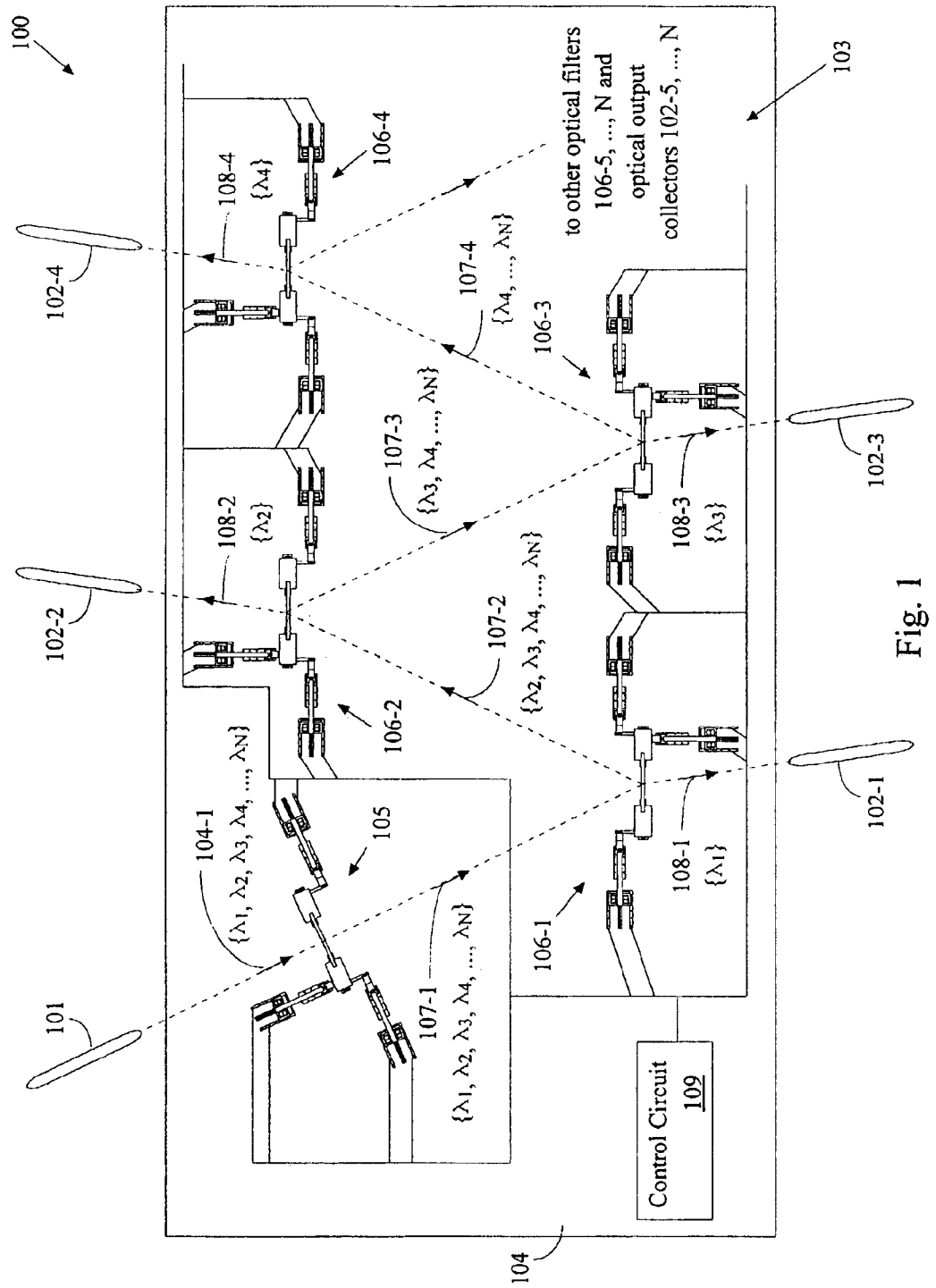
FIG. 1 shows the configuration of a first embodiment of an optical network that comprises an optical input source, optical output collectors, and a WDM MUX/DMUX optically coupled between the optical input source and the optical output collectors.

FIG. 1 shows a first exemplary embodiment of the present invention in the form of an optical network 100. The optical network 100 comprises an optical input source 101, N optical output collectors 102-1, 2, 3, 4, . . . , N, and a WDM MUX/DMUX (multiplexer/demultiplexer) 103 formed on an integrated MEMS chip 104. The MUX/DMUX 103 is monolithically fabricated on and self assemblable on the chip 104. The MUX/DMUX 103 comprises MEMS filter/lens optical components 105 and 106-1, 2, 3, 4, . . . , N that are integrated on the chip 104. The filter/lens optical components 105 and 106-1, 2, 3, 4, . . . , N are all monolithically fabricated on the chip 104 and are all self assemblable on the chip 104 under the control of the control circuit 109.

The optical input source 101 is configured to provide a collimated input light beam 107-1 having multiple wavelengths $\{\lambda_1, \lambda_2, \lambda_3, \lambda_4, \ldots, \lambda_N\}$. The optical input source 101 may comprise an optical fiber, a laser, or other light source.

The MUX/DMUX is used in the optical network 100 for demultiplexing. The optical input source 101 is optically coupled to the MUX/DMUX 103 and provides the MUX/DMUX 103 with the input light beam 107-1. The MUX/DMUX 103 is configured to demultiplex (or separate) the input light beam 107-1 into output light beams 108-1, 2, 3, 4, . . . , N having individual wavelengths $\lambda_1, \lambda_2, \lambda_3, \lambda_4, \ldots, \lambda_N$, respectively.

The filter/lens optical component 105 is optically coupled to the optical input source 101 to receive the input light beam 107-1. The filter/lens optical component 105 is optically coupled to the first filter/lens optical component 106-1 and is configured to focus and direct the input light beam 107-1 to the first filter/lens optical component 106-1.

The filter/lens optical components 106-1, 2, 3, 4, . . . , and N−1 are optically coupled to the filter/lens optical components 106-2, 3, 4, . . . , N, respectively, to provide the filter/lens optical components 106-2, 3, 4, . . . , N with input light beams 107-2, 3, 4, . . . , N. The input light beams 107-2, 3, 4, . . . , N respectively have the wavelengths $\lambda_2, \lambda_3, \lambda_4, \ldots \lambda_N$, the wavelengths $\lambda_3, \lambda_4, \ldots, \lambda_N$, the wavelengths $\lambda_4, \ldots, \lambda_N, \ldots,$ the wavelength $\lambda_N$. The filter/lens optical components 106-1, 2, 3, 4, . . . , N are also optically coupled to the optical output collectors 102-1, 2, 3, 4, . . . , N, respectively, to provide the optical output collectors 102-1, 2, 3, 4, . . . , N with the output light beams 108-1, 2, 3, 4, . . . , N, respectively.

In performing the functions just described, each filter/lens optical component 106-$n$, where n=1, 2, 3, 4, . . . , N, is configured to separate a corresponding wavelength $\lambda_n$ from the wavelengths $\lambda_n, \lambda_{n+1}, \ldots, \lambda_N$ of the corresponding input light beam 107-$n$ to produce the corresponding output light beam 108-$n$. The filter/lens optical component 106-$n$ directs this output light beam 108-$n$ to the corresponding optical output collector 102-$n$ to which the filter/lens optical component 106-$n$ is optically coupled. Each optical output collector 102-$n$ is configured to collect the corresponding output light beam 108-$n$ and may comprise an optical fiber or other light collector.

Each filter/lens optical component 106-$n$, where n=1, 2, 3, 4, . . . , N−1, is also configured to reflect the other wavelengths $\lambda_{n+1}, \ldots, \lambda_N$ of the corresponding input light beam 107-$n$ to produce the corresponding input light beam 107-$n$+1 for the next filter/lens optical component 106-$n$+1. This input light beam 107-$n$+1 is directed by the filter/lens optical component 106-$n$ to the next filter/lens optical component 106-$n$+1 to which the filter/lens optical component 106-$n$ is optically coupled.

The MUX/DMUX 103 also comprises a control circuit 109. The control circuit 109 is integrated on the chip 104 along with the filter/lens optical component 105 and the filter/lens optical components 106-1, 2, 3, 4, . . . , N. However, in an alternative configuration for the MUX/DMUX 103, the control circuit 109 could be located off the chip 104.

The MUX/DMUX 103 is self assemblable on the chip 104 under the control of the control circuit 109. This is due to the fact that the filter/lens optical component 105 and the filter/lens optical components 106-1, 2, 3, 4, . . . , N are all self assemblable on the chip 104 under the control of the control circuit 109. The filter/lens optical component 105 and the filter/lens optical components 106-1, 2, 3, 4, . . . , N are each shown in their completely assembled state in FIG. 1. The self assembly of the filter/lens optical components 105 and 106-1, 2, 3, 4, . . . , N provides very accurate automated optical alignment of the filter/lens optical components 105 and 106-1, 2, 3, 4, . . . , N on the chip 104. Thus, the effort and the inaccuracy of manual optical alignment on the chip 104 is avoided. The configuration and the self assembly of each of the filter/lens optical components 105 and 106-1, 2, 3, 4, . . . , N will be discussed in greater detail next.

Filter/Lens Optical Component 106-n

Figure 2:
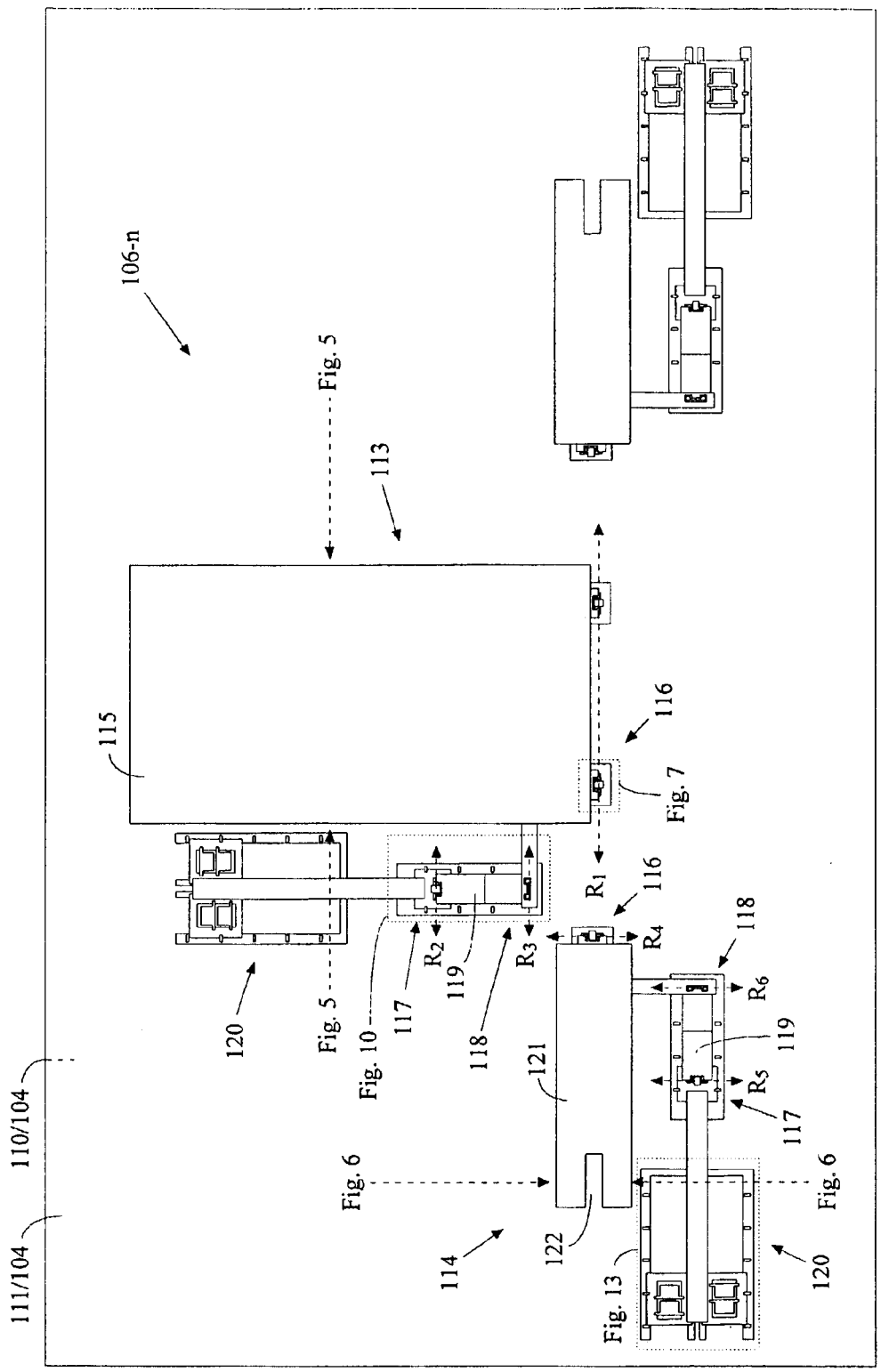
FIGS. 2, 3, and 4 show the configuration of a MEMS lens/filter optical component of the WDM MUX/DMUX of FIG. 1 in its respective unassembled, partially assembled, and completely assembled states.
Figure 3:
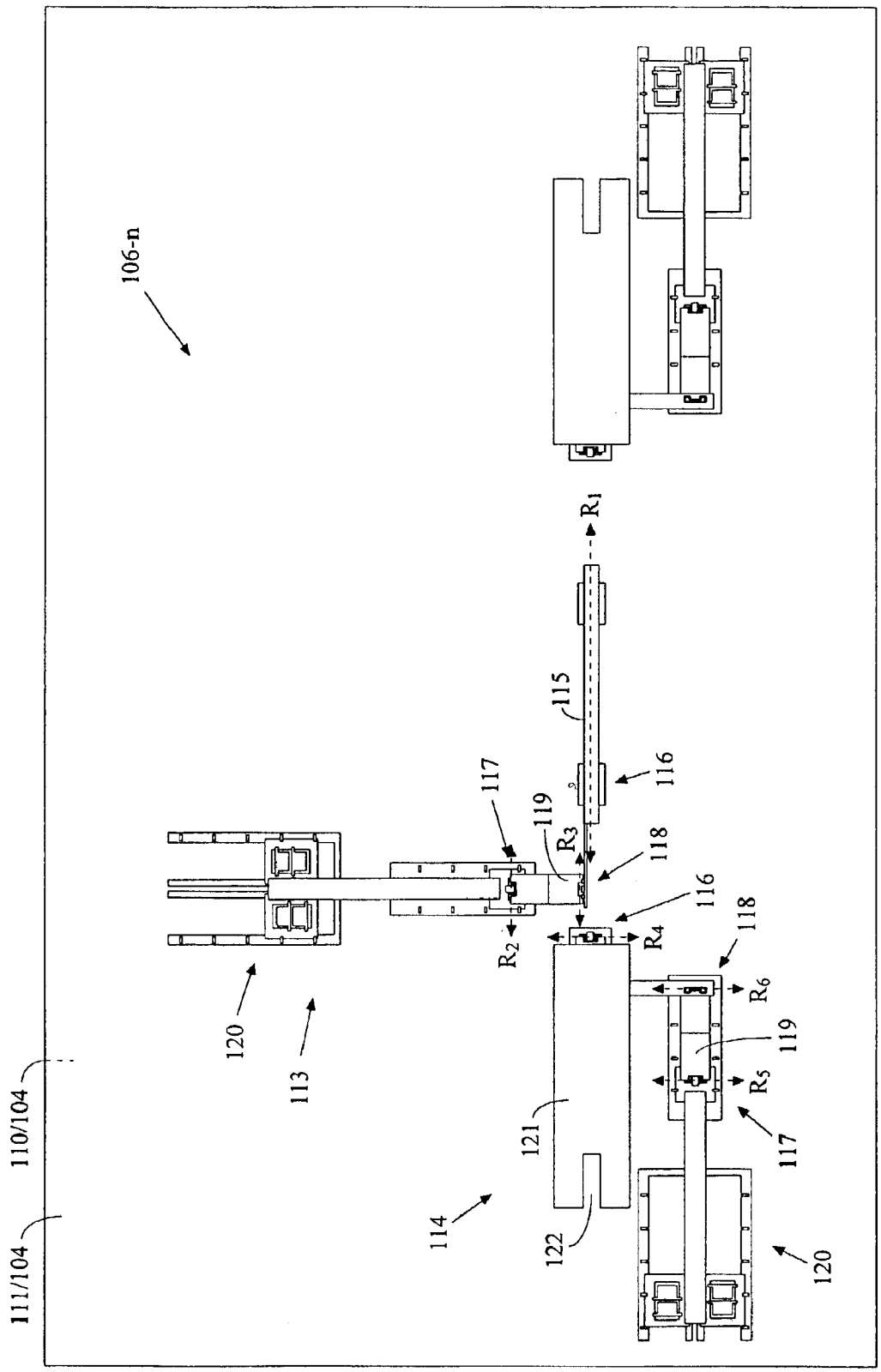
Figure 4:
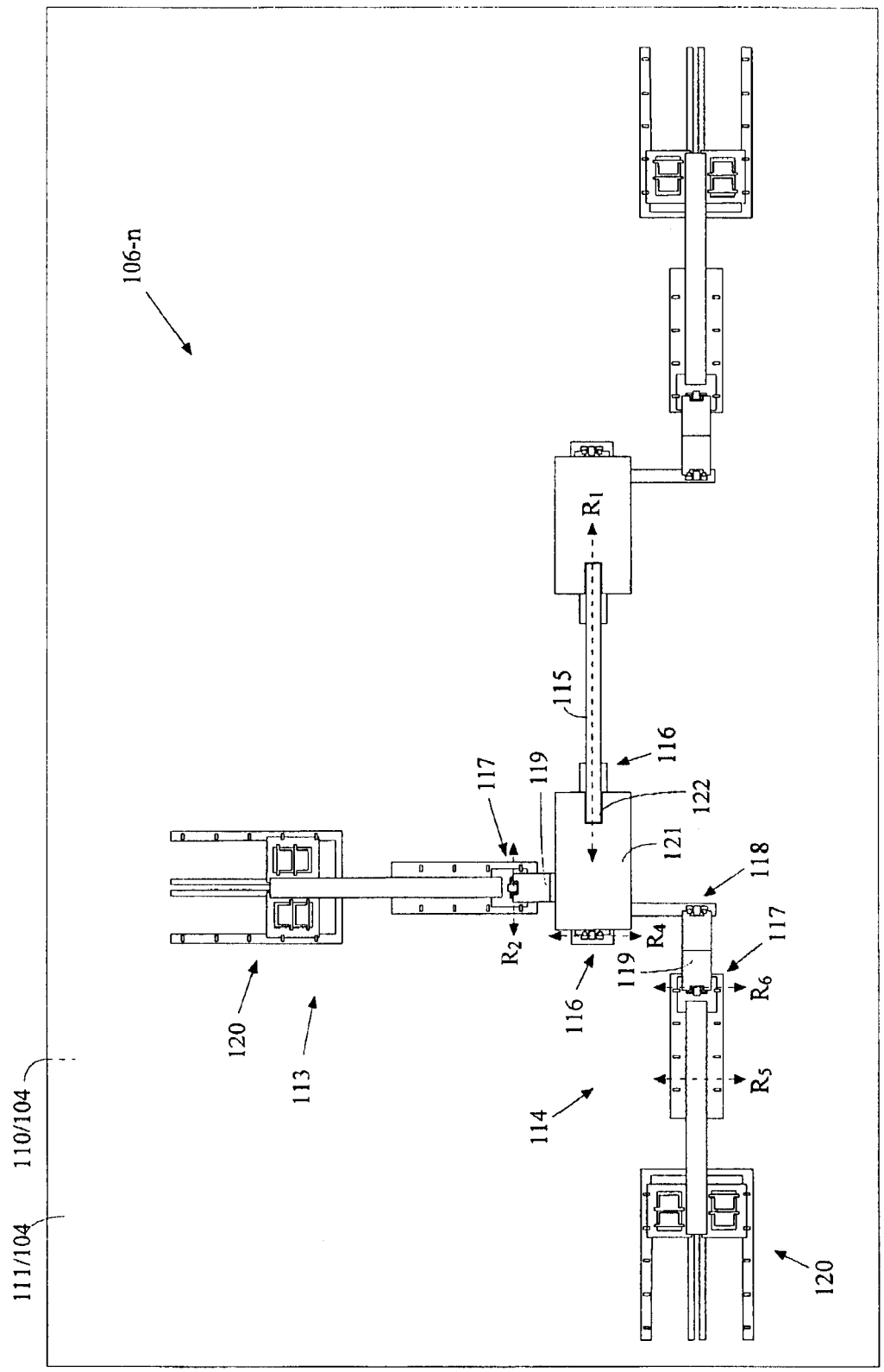

FIGS. 2, 3, and 4 show the configuration of each filter/lens optical component 106-n, where n=1, 2, 3, 4, . . . , N, in its unassembled, partially assembled, and completely assembled states, respectively. Each filter/lens optical component 106-n is monolithically fabricated and comprises an element structure assembly 113 and locking latch assemblies 114. Each filter/lens optical component 106-n also comprises corresponding portions of a semiconductor substrate 110 and an insulating layer 111 of the chip 104 of FIG. 1. The element structure assembly 113 and the locking latch assemblies 114 are formed on this portion of the insulating layer 111.

The element structure assembly 113 comprises an element structure 115. FIG. 2 shows the element structure 115 in a lying position in the unassembled state of the filter/lens optical component 106-n. In this lying position, the element structure 115 is generally parallel to the horizontal plane (and the substrate 110 and the insulating layer 111) in which the chip 104 is oriented. Conversely, FIGS. 3 and 4 show the element structure 115 in an upright position in the partially assembled and completely assembled states of the filter/lens optical component 106-n. In the upright position, the element structure 115 is generally perpendicular to the horizontal plane (and the substrate 110 and the insulating layer 111).

The element structure assembly 113 also comprises corresponding micro-mechanical hinges 116. Each hinge 116 pivotally couples the bottom side of the element structure 115 to the insulating layer 111. This bottom side is parallel to the common rotation axis $R_1$ of the hinges 116. The top side of the element structure 115 is free and uncoupled. As a result, the element structure 115 can pivot about the rotation axis $R_1$ of the hinges 116 from its lying position to its upright position. Although the element structure assembly 113 is shown comprising two hinges 116, one or more hinges 116 could be used.

The element structure assembly 113 further comprises corresponding micro-mechanical hinges 117 and 118, a corresponding support arm 119, and a corresponding MEMS actuator mechanism 120. The element structure 115 is moveably coupled to the corresponding actuator mechanism 120 by the hinges 117 and 118 and the support arm 119. More specifically, the hinge 117 pivotally couples a corresponding end of the support arm 119 to the actuator mechanism 120 so that the support arm 119 can pivot about the rotation axis $R_2$ of the hinge 117. The hinge 118 has a rotation axis $R_3$ and pivotally couples the corresponding opposite end of the support arm 119 to the left or right side of the element structure 115 that is adjacent to the hinges 117 and 118, the support arm 119, and the actuator mechanism 120. This enables the support arm 119 to also pivot about the rotation axis $R_3$ of the hinge 118. The rotation axes $R_2$ and $R_3$ of the hinges 117 and 118 are parallel to the rotation axis $R_1$ of the hinge 116. As a result, the hinges 116, 117, and 118 and the support arm 119 cooperatively translate the lateral movement of the actuator mechanism 120 into pivoting movement by the element structure 115 about the rotation axis $R_1$.

As mentioned earlier, FIG. 2 shows the filter/lens optical component 106-n in its unassembled state with the element structure 115 in its lying position. To begin assembly of the filter/lens optical component 106-n for normal operation in the MUX/DMUX 103 of FIG. 1, the control circuit 109 of FIG. 1 controls the actuator mechanism 120 of the element structure assembly 113 to laterally move forward. This is done in the manner described later. The hinges 116, 117, and 118 and the support arm 119 cooperatively translate this lateral forward movement of the actuator mechanism 120 into pivoting movement by the element structure 115 about the rotation axis $R_1$ until the element structure 115 is in its upright position in the partially assembled state of the filter/lens optical component 106-n shown in FIG. 3. More specifically, when the actuator mechanism 120 moves laterally forward, the corresponding hinge 117 also moves laterally forward so that the end of the corresponding support arm 119 pivotally coupled to the hinge 117 is pushed laterally forward and causes the support arm 119 to pivot about the rotation axis $R_2$ of the hinge 117. As a result, the opposite end of the support arm 119 pivotally coupled to the corresponding hinge 118 pushes the hinge 118 vertically and rotationally up as the support arm 119 pivots about the rotation axis $R_2$ of the hinge 118. This in turn causes the hinge 118 to push the element structure 115 vertically and rotationally up so that the element structure 115 pivots about the rotation axis $R_1$ of the hinges 116 until the element structure 115 is in its upright position.

To properly align the element structure 115 of each filter/lens optical component 106-n in its proper upright position, an optical input source, optical output collectors, and an optical spectrum analyzer may be used. The optical input source would be located so as to direct an input light beam at the element structure 115 in the desired optical path that the corresponding input light beam 107-n would have in the MUX/DMUX 103. One optical output collector would then be located so as to receive a first output light beam in the desired optical path that the corresponding output light beam 102-n would have in the MUX/DMUX 103. The other optical output collector would then be located so as to receive a second output light beam in the desired optical path that the corresponding input light beam 102-n+1 for the next filter/lens optical component 106-n+1 would have in the MUX/DMUX 103. The optical spectrum of the first and second output light beams would then be analyzed with the sepctrum analyzer. The pivoting of the element structure 115 would then be controlled until the optical spectrum provided by the spectrum analyzer indicated that the element structure 115 was in the desired upright position. As those skilled in the art will recognize, other methods could also be used to properly align the element structure 115.

Referring again to FIGS. 2 to 4, each locking latch assembly 114 comprises a corresponding locking latch (or plate) 121 and a corresponding hinge 116. FIGS. 2 and 3 show the locking latch 121 of each locking assembly 114 in a lying position parallel to the insulating layer 111 in the unassembled and partially assembled states of the filter/lens optical component 106-n. On the other hand, FIG. 4 shows the locking latch 121 of each locking latch assembly 114 in a locking position in the completely assembled state of the filter/lens optical component 106-n. In the same way that each hinge 116 of the element structure assembly 113 pivotally couples one side of the element structure 115 to the insulating layer 111, the hinge 116 of each locking latch assembly 114 pivotally couples the bottom side of the corresponding locking latch 121 to the insulating layer 111. This bottom side is parallel to the rotation axis $R_4$ of the hinge 116. The top side of the locking latch 121 is free and uncoupled in the lying position. The locking latch 121 can therefore pivot about the rotation axis $R_4$ of the hinge 116 from its lying position to its locking position. The top side of the locking latch 121 includes a slot 122 that is sized to closely receive the corresponding left or right side of the element structure 115 in the locking position.

Similar to the element structure assembly 113, each locking latch assembly 114 also comprises corresponding hinges 117 and 118, a corresponding support arm 119, and a corresponding actuator mechanism 120. The locking latch 121 is moveably coupled to the corresponding actuator mechanism 120 by the hinges 117 and 118 and the support arm 119. This is done in a similar manner to that in which the element structure 115 is moveably coupled to the corresponding actuator mechanism 120 in the element structure assembly 113. Here, however, the hinges 117 and 118 have rotation axes $R_5$ and $R_6$, respectively, so that the support arm 119 pivots about the rotation axes $R_5$ and $R_6$. The rotation axes $R_5$ and $R_6$ are parallel to the rotation axis $R_4$ of the hinge 116. The hinges 116, 117, and 118 and the support arm 119 therefore cooperatively translate the lateral movement of the actuator mechanism 120 into pivoting movement by the locking latch 121 about the rotation axis $R_4$.

In the unassembled and partially assembled states of the filter/lens optical component 106-n shown in FIGS. 2 and 3, the locking latch 121 of each locking latch assembly 114 is in its lying position. To place the filter/lens optical component 106-n in the completely assembled state after the element structure 115 is in the upright position of the partially assembled state shown in FIG. 3, the control circuit 109 of FIG. 1 controls the actuator mechanism 120 of the element structure assembly 113 to laterally move forward so that the hinges 116, 117, and 118 and the support arm 119 cooperatively translate this lateral forward movement into pivoting movement by the locking latch 121 about the rotation axis $R_4$. The locking latch 121 is pivoted about the rotation axis $R_4$ until the locking latch 121 is in its locking position in the completely assembled state of the filter/lens optical component 106-n shown in FIG. 4. The manner in which this is done is similar to that in which the control circuit 109 causes the element structure 115 of the element structure assembly 113 to be pivoted until it is in its upright position. Here, however, the pivoting of the support arm 119 of each locking latch assembly 114 occurs about the rotation axes $R_5$ and $R_6$ and the pivoting of the locking latch 121 of each locking latch assembly 114 occurs about the rotation axis $R_4$.

However, it may be the case that the element structure 115 of each filter/lens optical component 106-n is stable enough for proper optical alignment in its upright position with only one or even no locking latch assemblies 114. Thus, each filter/lens optical component 106-n could comprise none or one or more locking latch assemblies 114.

Furthermore, as those skilled in the art will recognize, each filter/lens optical component 106-n is also dissassemblable. In order to disassemble each filter/lens optical component 106-n, the reverse process to the assembly process just described would be used. However, in some applications it may be the case that only assembly is required.

Filter Pate Assembly 113

Figure 5:
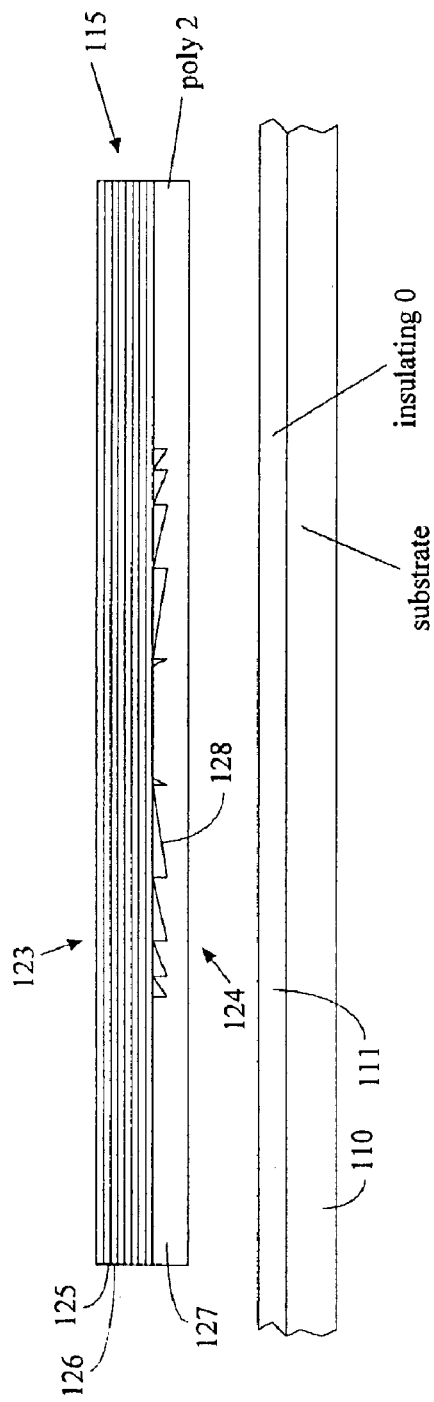
FIG. 5 shows the configuration of a element structure of an element structure assembly of the lens/filter optical component of FIGS. 2 to 4.

FIG. 5 shows the configuration of the element structure 115 of the element structure assembly 113 of FIGS. 2 to 4. The element structure 115 comprises a support plate 127, a thin film bandpass filter optical element 123 formed on the support plate 127, and a planar Fresnel lens optical element 124 formed on/in the support plate 127.

The bandpass filter optical element 123 is configured to optically interact with the corresponding input light beam 107-n to allow a corresponding wavelength $\lambda_n$ of the wavelengths $\lambda_n, \lambda_{n+1}, \ldots, \lambda_N$ in the corresponding input light beam 107-n of FIG. 3 to pass through the bandpass filter optical element 123 while reflecting the other wavelengths $\lambda_{n+1}, \ldots, \lambda_N$. The bandpass filter optical element 123 comprises alternating high and low reflectivity thin film material plates 125 and 126 formed on one side of the support plate 127. The thin film material plates 125 and 126 are spaced at quarter wavelengths from each other.

The Fresnel lens optical element 124 is configured to optically interact with the corresponding input light beam 107-n by focusing and directing the corresponding wavelength $\lambda_n$ passed by the bandpass filter optical element 123 to produce the output light beam 108-n of FIG. 3. The Fresnel lens optical element 124 comprises a Fresnel pattern 128 formed on the opposite side of the support plate 127 on which the thin film material plates 125 and 126 are formed. The Fresnel pattern 128 may be integrally formed with the support plate 127 by appropriately etching the support plate 127 to produce the Fresnel pattern 128. Alternatively, a metal pattern could be formed on the support plate 127 to produce the Fresnel lens optical element 124.

Figure 7:
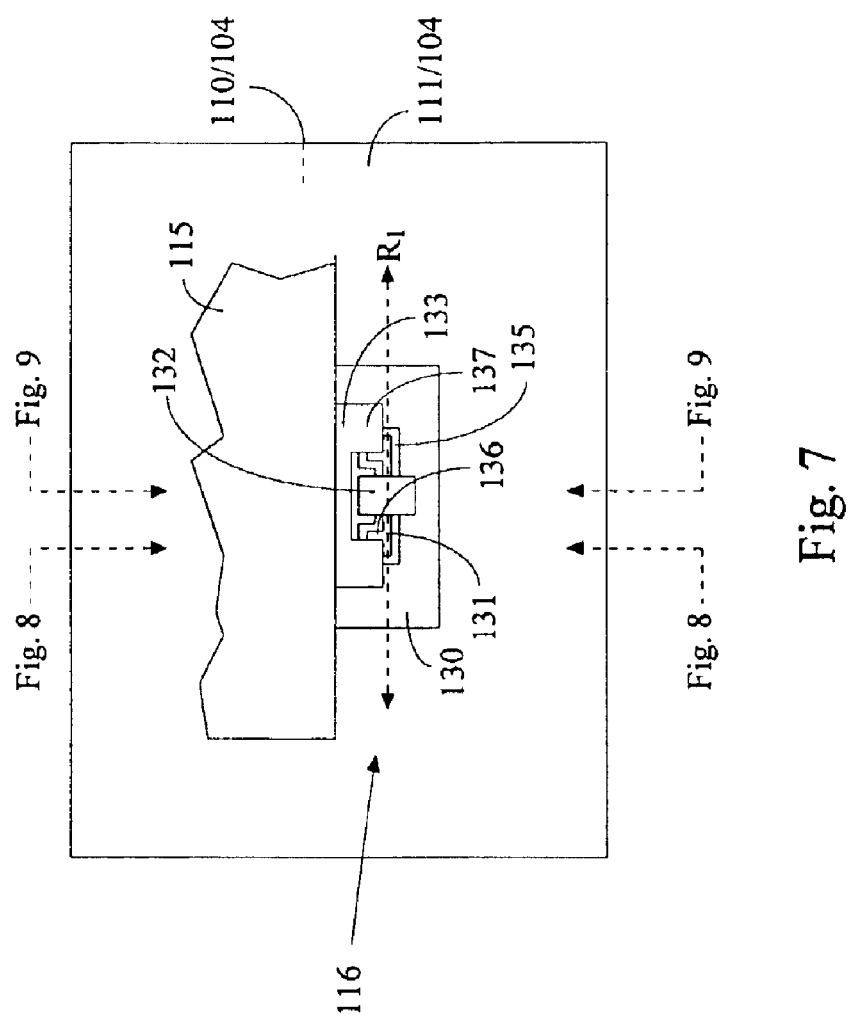
FIGS. 7 to 9 show the configuration of each hinge of the element structure assembly of the lens/filter optical component of FIGS. 2 to 4.
Figure 8:
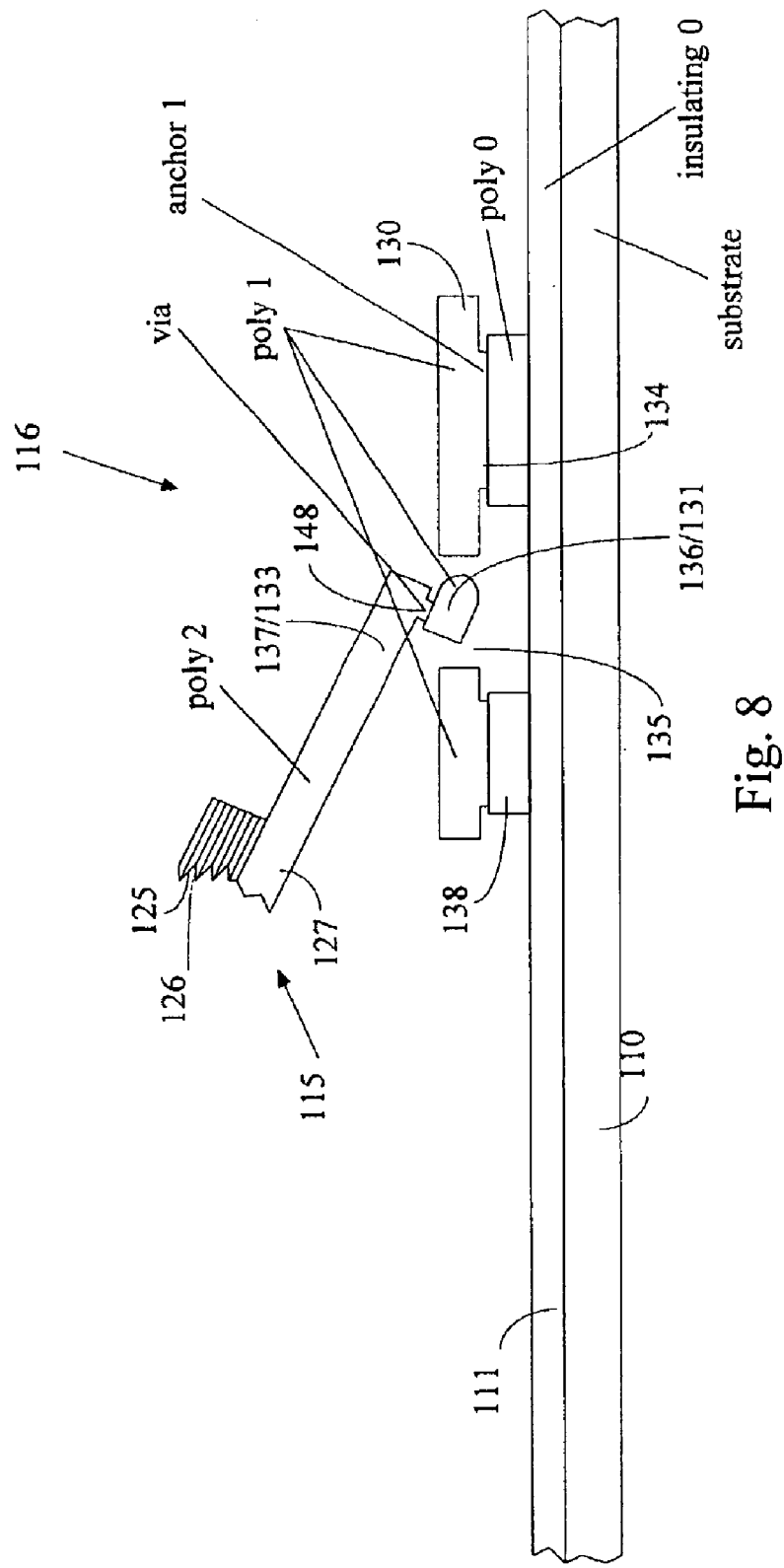
Figure 9:
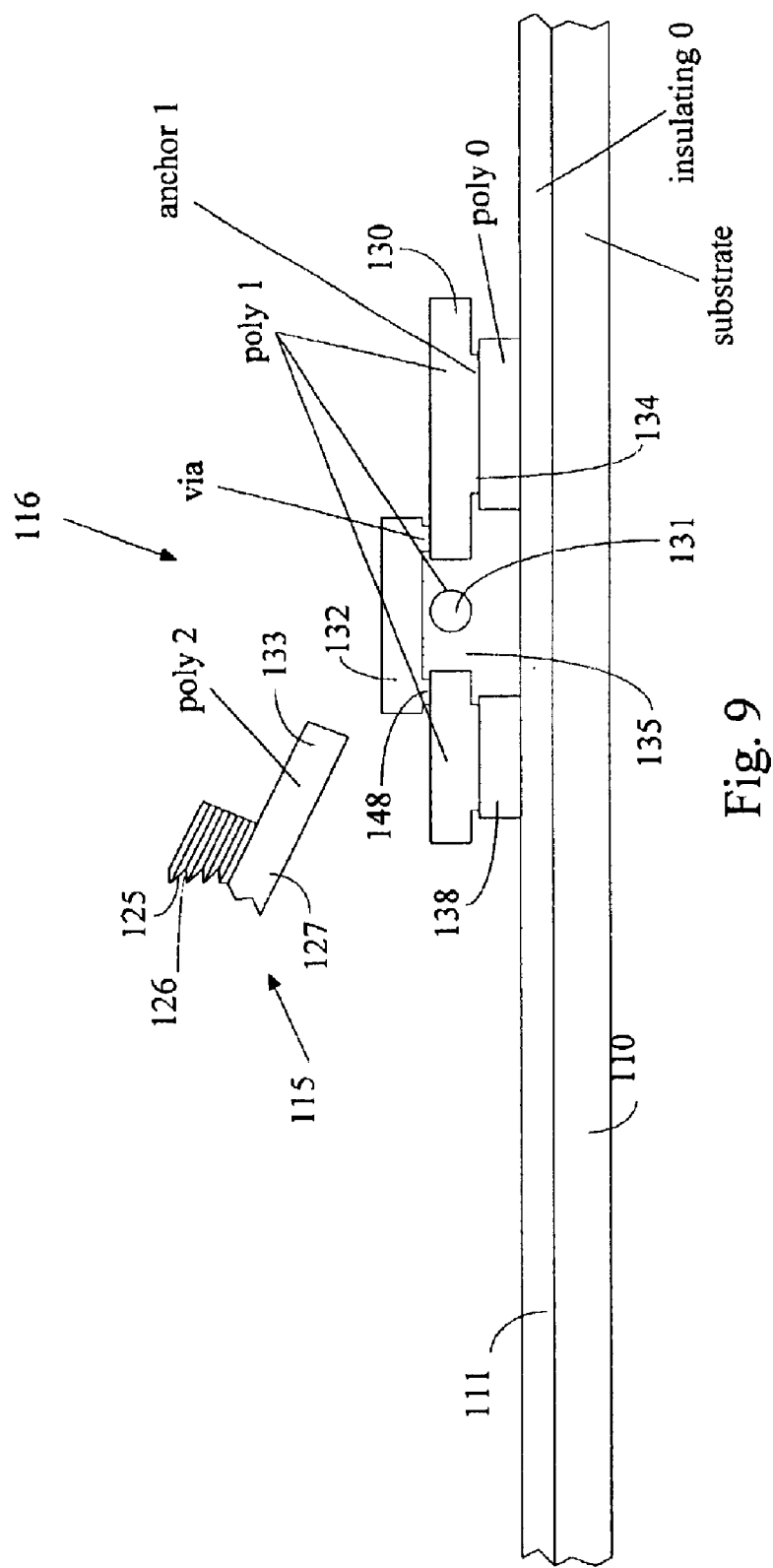
Figure 10:
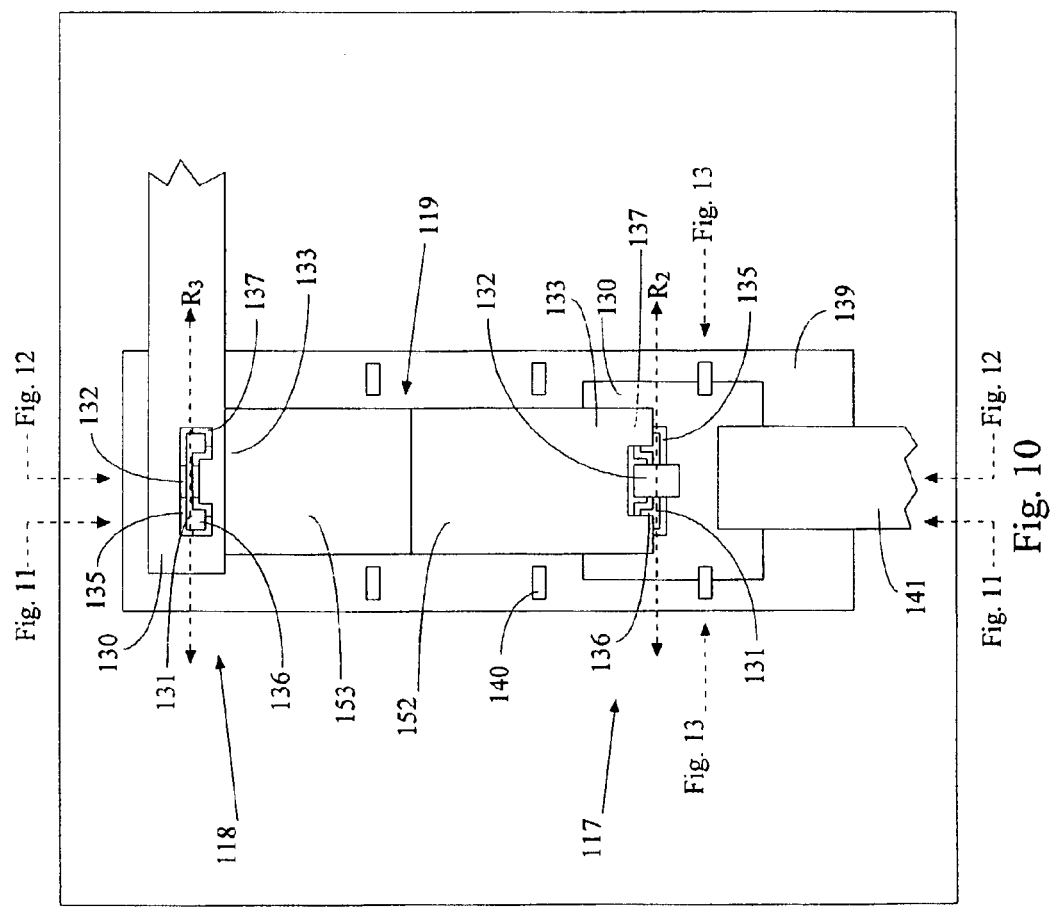
FIGS. 10 to 13 show the configuration of two hinges and a support arm of the element structure assembly of the lens/filter optical component of FIGS. 2 to 4.
Figure 11:
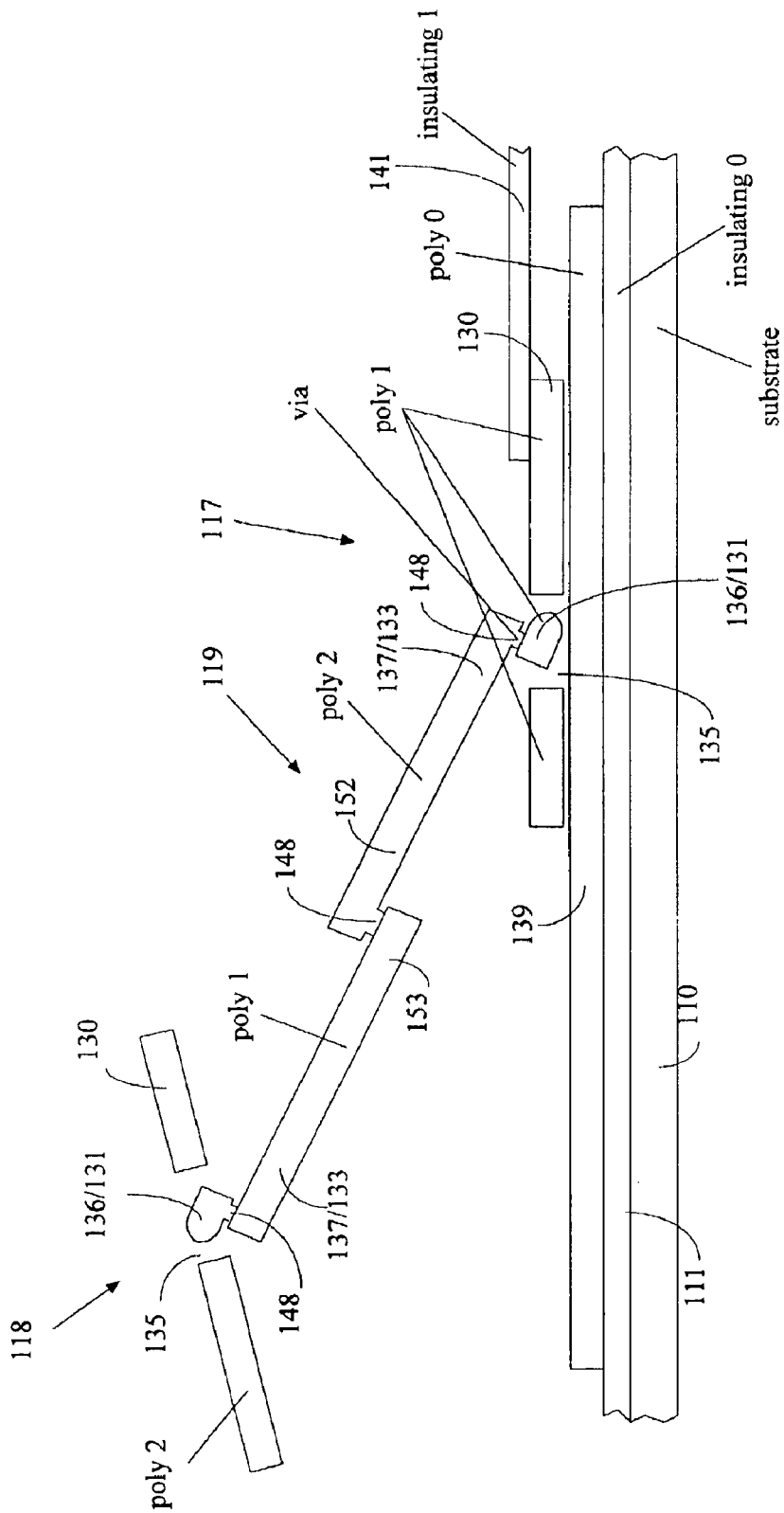
Figure 12:
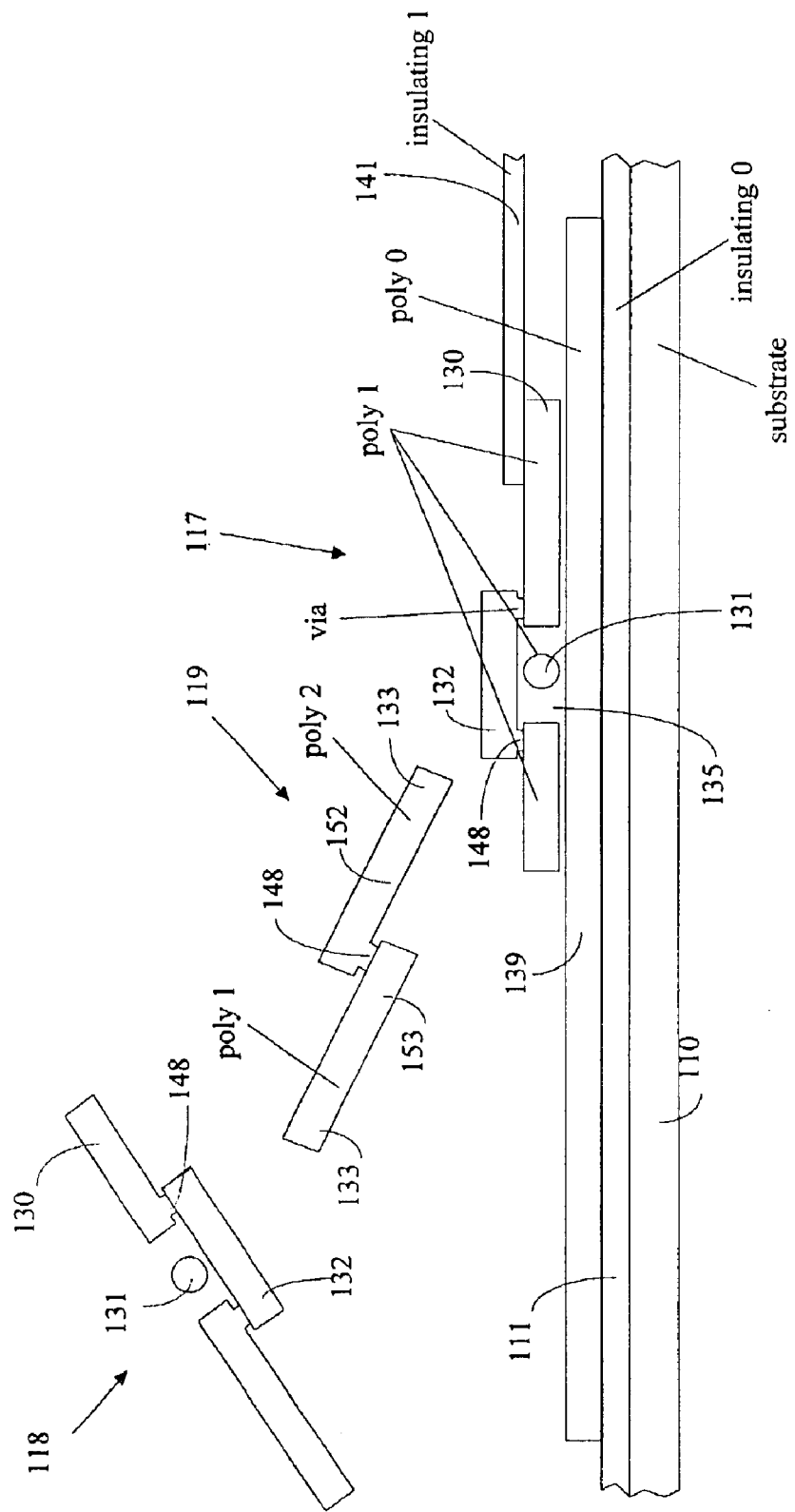

FIGS. 7 to 9 show the configuration of each hinge 116 of the element structure assembly 113 of FIGS. 2 to 4. Each hinge 116 comprises a first hinge plate 130, a hinge pin 131, a locking arm 132, a second hinge plate 133, anchors 134, vias 148, and a base 138. The base 138 is fixedly coupled to the insulating layer 111. The hinge plate 130 is fixedly coupled to the base 138 with anchors 134. The hinge pin 131 is disposed and rotates in an opening 135 of the hinge plate 130 along the rotation axis $R_1$ of the hinge 116. The locking arm 132 is fixedly coupled to the hinge plate 130 with vias 148 and extends over the opening 135. The opposite ends of the hinge pin 131 include attachment arms 136 while the hinge plate 133 also includes attachment arms 137. Each attachment arm 136 is fixedly coupled to a corresponding attachment arm 137 with a corresponding via 148. The end of each attachment arm 137 extends over the hinge plate 130. This enables the locking arm 132 and the attachment arms 137 to cooperatively rotatably lock the hinge pin 131 in place so that the hinge pin 131 can rotate about the rotation axis $R_1$. As a result, the hinge plate 133 can correspondingly pivot about the rotation axis $R_1$.

The hinge plate 133 is fixedly coupled to the bottom side of the element structure 115. In fact, the hinge plate 133 may be integrally formed with the bottom side of the support plate 127 of the element structure 115. When the hinge plate 133 pivots about the rotation axis $R_1$, the element structure 115 does the same.

FIGS. 10 to 13 also show the configuration of each support arm 119 of the element structure assembly 113 of FIGS. 2 to 4. Each support arm comprises a corresponding first support strip 152, a corresponding second support strip 153, and a corresponding via 148. The first and second support strips 152 and 153 are fixedly coupled to each other by the via 148.

FIGS. 10 to 13 further show the configuration of each hinge 1117 of the element structure assembly 113 of FIGS.

2 to 4. The hinge 117 is configured and operates similar to the hinge 116 of FIGS. 7 to 9 in that it comprises a first hinge plate 130, a hinge pin 131 with attachment arms 136, a locking arm 132, a second hinge plate 133 with attachment arms 137, and vias 148. However, in contrast to each hinge 116, the hinge 117 comprises a guide plate 139 that is stationary and fixedly coupled to the insulating layer 111 and the hinge plate 130 laterally slides on the guide plate 139. The hinge 117 also comprises guiding overhangs 140 and anchors 154 for the guiding overhangs 140.

Each guiding overhang 140 is fixedly coupled to the guide plate 139 by a corresponding anchor 154. Each anchor 154 extends up from the guide plate 139 along the outer surface of the hinge plate 130 and the guiding overhang extends over the upper surface of the hinge plate 130. Together, these guiding overhangs 140 guide the hinge plate 130 as it moves laterally on the guide plate 139.

In the case of the hinge 117, the hinge plate 130 also comprises contact rails 149 to enable the hinge plate 130 to laterally slide on the guide plate 139 with minimal friction and stiction. Each rail 149 may be continuous or may comprise a row of protrusions or bumps.

As in the hinge 116 of FIGS. 7 to 9, the locking arm 132 and the attachment arms 137 of the hinge plate 133 of the hinge 117 cooperatively rotatably lock the hinge pin 131 in place within the opening 135 of the hinge plate 130. As a result, the hinge pin 131 can rotate about the rotation axis $R_2$ of the hinge 117 and the hinge plate 133 can correspondingly pivot about the rotation axis $R_2$.

In the element structure assembly 113 of FIGS. 2 to 4, the hinge plate 130 of the hinge 117 is fixedly coupled to an insulating attachment bridge 141 of the corresponding actuator mechanism 120 of the element structure assembly 113. As a result, the hinge plate 130 moves laterally with the actuator when the actuator mechanism 120 is controlled to move laterally by the control circuit 109 of FIG. 1. The hinge plate 133 is fixedly coupled to one end of the support arm 119 and in fact may be integrally formed with the support strip 152 of the support arm 119 at that end. The support arm 119 is therefore pivotally coupled to the actuator mechanism 120 by the hinge 117 so that the support arm 119 can pivot about the rotation axis $R_2$ of the hinge 117 when the actuator mechanism 120 is controlled to move laterally.

FIGS. 10 to 13 also show the configuration of each hinge 118 of the element structure assembly 113 of FIGS. 2 to 4. Like the hinge 117, the hinge 118 is also configured and operates similar to the hinge 116 of FIGS. 7 to 9 in that it also comprises a first hinge plate 130, a hinge pin 131 with attachment arms 136, a locking arm 132, a second hinge plate 133 with attachment arms 137, and vias 148. However, the configuration of the hinge 118 is upside down from that of the hinges 116 and 117 and both the hinge plates 130 and 133 pivot about the rotation axis $R_3$ in the case of the hinge 118 in the element structure assembly 113 or the rotation axis $R_6$ in the case of the hinge 118 in each locking latch assembly 114. As in the hinges 116 and 117, the locking arm 132 and the attachment arms 137 of the hinge plate 133 cooperatively rotatably lock the hinge pin 131 in place within the opening 135 of the hinge plate 130. In the case of the hinge 118 in the element structure assembly 113, this enables the hinge pin 131 to rotate about the rotation axis $R_3$ and both hinge plates 130 and 133 to correspondingly pivot about the rotation axis $R_3$. The same is true for the hinge 118 in each locking latch assembly 114 except that the hinge pin 131 rotates and the hinge plates 130 and 133 pivot about the rotation axis $R_6$.

In the element structure assembly 113 of FIGS. 2 to 4, the hinge plate 130 of the hinge 118 is fixedly coupled to the left or right side of the element structure 115 that is adjacent to the hinges 117 and 118, the support arm 119, and the actuator mechanism 120 of the element structure assembly 113. In fact, the hinge plate 130 may be integrally formed with the support plate 127 of FIG. 5 of the element structure 115 at this side. This is done in a similar manner to that in which the hinge plate 133 of the hinge 116 of FIGS. 7 to 9 is integrally formed with the support plate 127. Furthermore, referring back to FIGS. 10 to 13, the hinge plate 133 of the hinge 118 is fixedly coupled to the opposite end of the support arm 119 to that which the hinge plate 133 is fixedly coupled. The hinge plate 133 may be integrally formed with the support strip 153 of the support arm 119 at that end. As a result, the support arm 119 is also pivotally coupled to the element structure 115 by the hinge 118 so that the support arm 119 can also pivot about the rotation axis $R_3$ of the hinge 118.

Figure 14:
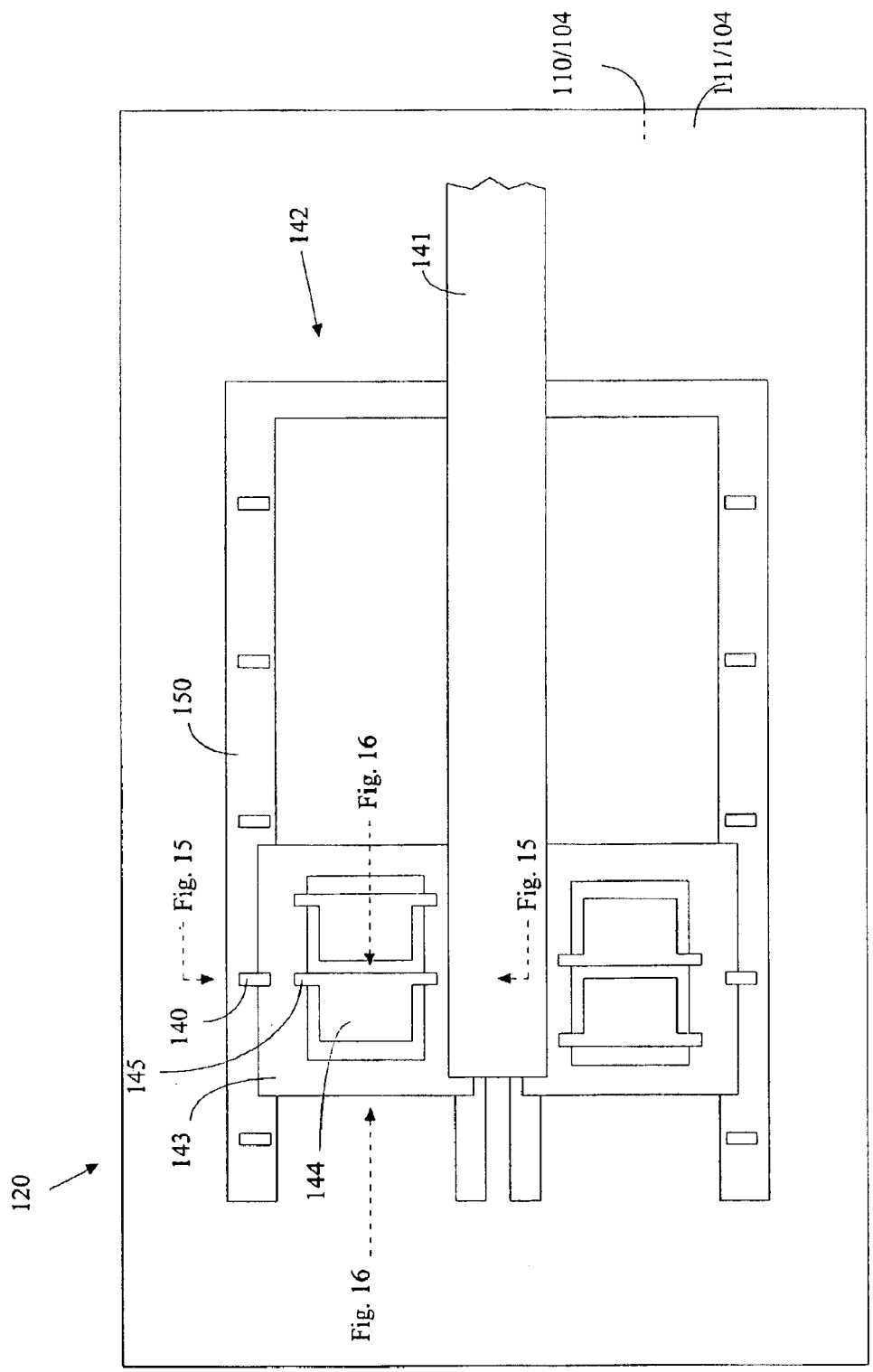

FIGS. 14 to 16 show the configuration of each actuator mechanism 120 of the element structure assembly 113 of FIGS. 2 to 4. The actuator mechanism 120 comprises actuator sub-mechanisms 142 and the insulating attachment bridge 141 mentioned earlier. One of the actuator sub-mechanisms 142 is configured for forward movement and the other is configured for backward movement. Each actuator sub-mechanism 142 comprises a conductive support frame 143 that is fixedly coupled to the support frame 143 of the other actuator sub-mechanism 142 with the insulating attachment bridge 141. The insulating attachment bridge 141 fixedly couples, but electrically isolates, the support frames 143 of the actuator sub-mechanisms 142.

Each actuator sub-mechanism 142 also comprises an array of SDAs (scratch-drive actuators) 144 and conductive flexible attachment arms 145. Each SDA 144 is fixedly coupled and electrically connected to the support frame 143 of the actuator sub-mechanism 142 by corresponding attachment arms 145.

As shown in FIGS. 15 and 16, each SDA 144 comprises a corresponding plate 146 and a corresponding bushing 147. The plate 146 is fixedly coupled and electrically connected to corresponding attachment arms 145 and may be integrally formed with these attachment arms 145. The attachment arms 145 are themselves fixedly coupled and electrically connected to the support frame 143 of the corresponding actuator sub-mechanism 142 by vias 148 of the actuator sub-mechanism 142.

Referring back to FIG. 14, the SDAs 144 of each actuator sub-mechanism 142 are aligned for forward or backward movement depending on whether the actuator sub-mechanism 142 is to be used for forward or backward movement. The SDAs 144 are of the type described in T. Akiyama and K. Shono, "Controlled Stepwise Motion in Polysilicon Microstructures", J. of MEMS, Vol. 2, No. 3, pp. 106, September 1993, and T. Akiyama and H. Fujita, "A Quantative Analysis of Scratch Drive Actuator Using Buckling Motion", IEEE Micro Electro Mechanical Networks, pp. 310–315, 1995. These articles are hereby incorporated by reference.

Referring again to FIGS. 15 and 16, each actuator sub-mechanism 142 also comprises conductive contact rails 149 and conductive bias lines 150. The contact rails 149 are fixedly coupled to and patterned on the lower surface of the support frame 143 of the actuator sub-mechanism 142 and, in fact, may be integrally formed with the support frame 143. The contact rails 149 are also electrically connected to the support frame 143. The bias lines 150 are fixedly coupled to and patterned on the insulating layer 111. The contact rails 149 laterally slide on and electrically contact the bias lines 150. Thus, the contact rails 149 enable the support frame 143 to laterally slide on and be electrically connected to the bias lines 150 with minimal friction and stiction. Each contact rail 149 may be continuous or may comprise a row of protrusions or bumps.

Turning now to FIGS. 14 to 16, the conductive plate 146 of each SDA 144 of each actuator sub-mechanism 142 is electrically connected to the bias lines 150 of the actuator sub-mechanism 142 with the contact rails 149, the support frame 143, and the attachment arms 145 of the actuator sub-mechanism 142. Thus, when a periodic square wave bias signal is applied to the bias lines 150 by the control circuit 109 109 of FIG. 1, this signal is provided to the plate 146. Since the semiconductor substrate 110 is grounded, this causes the plate 146 to be pulled down toward the insulating layer 111 each time the signal reaches a high voltage. The plate 146 is pulled down because of the flexure in the flexible conductive attachment arms 145. Each time this occurs, the bushing 147 of the SDA 144 reaches out and contacts the insulating layer 110. Then, each time the signal goes to a low voltage, the plate 146 returns to its original position and the bushing 147 pulls the actuator mechanism 120 forward or backward a step depending on whether the actuator sub-mechanism 142 is configured for forward or backward movement. In this way, the SDAs 144 of the actuator sub-mechanism 142 configured for forward movement collectively move the entire actuator mechanism 120 forward in stepwise fashion and the SDAs configured for backward movement collectively move the entire actuator mechanism 120 backward in stepwise fashion.

Referring back to FIG. 14, each actuator mechanism 120 also comprises guiding overhangs 140 that are configured and operate like those of the hinge 117 of FIGS. 10 to 13. As shown in FIG. 15, each guiding overhang 140 is fixedly coupled to a corresponding bias line 150 by an anchor 154 of the actuator mechanism 120. Each anchor 154 extends up from the corresponding bias line 150 along the outer surface of the support frame 143 and the guiding overhang 140 extends over the upper surface of the support frame 143 of the corresponding actuator sub-mechanism 142. Referring again to FIG. 14, the guiding overhangs 140 collectively guide the entire actuator mechanism 120 as it moves forward or backward.

In an alternative configuration, each actuator mechanism 120 could comprise an array of side-drive actuators, such as those described in L. Fan, Y. C. Tai, and R. Muller, "IC Processed Electrostatic Micromotors", *Sensors and Actuators*, Vol. 20, pp. 4147, November 1989. Or, each actuator mechanism 120 could comprise an array of comb-drive actuators, such as those described in W. Tang, T. Nguyen, and R. Howe, "Laterally Driven Polysilicon Resonant Microstructures", *Sensors and Actuators*, Vol. 20, pp. 25, November 1989. Both of these articles are hereby incorporated by reference. Additionally, thermal actuators, piezoelectric actuators, and electromagnetic actuators or other types of actuators could also be used.

Locking Pate Assembly 114

Figure 6:
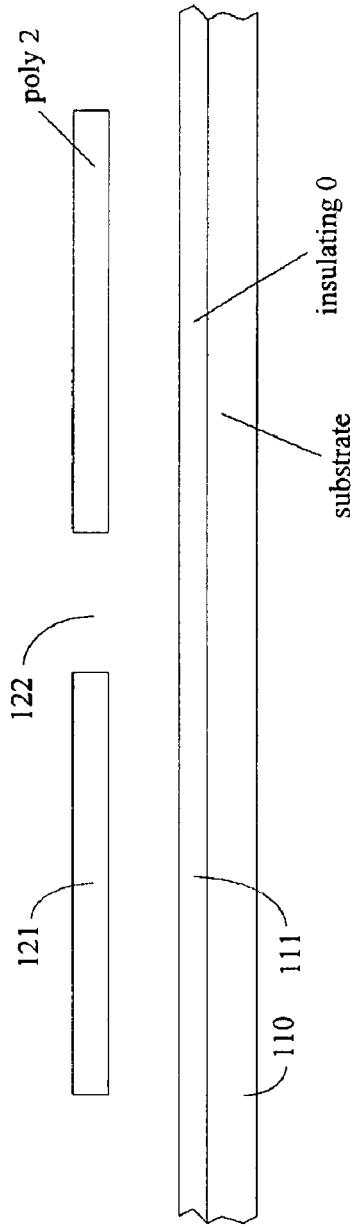
FIG. 6 shows the configuration of a locking latch of each locking latch assembly of the lens/filter optical component of FIGS. 2 to 4.

FIG. 6 shows the configuration of the locking latch 121 of each locking latch assembly 114 of the filter/lens optical component 106-n of FIGS. 2 to 4. The locking latch 121 has a slot corresponding left or right side of the element structure 115 in the locking position of the locking latch 121.

The configuration of each hinge 116 of each locking latch assembly of FIGS. 2 to 4 is the same as that shown in FIGS. 7 to 9 except that the hinge plate 133 is fixedly coupled to the bottom side of the locking latch 121. In fact, it may be integrally formed there with the bottom side of the locking latch 121. Furthermore, pivoting of the hinge plate 133 and the locking latch 121 and rotation of the hinge pin 131 occurs bout the rotation axis $R_4$.

Similarly, the configuration and operation of the hinge 117 and the support arm 119 of each locking latch assembly of FIGS. 2 to 4 is the same as that shown in FIGS. 10 to 13 except for a few differences. The rotation of the hinge pin 131 and the pivoting of the hinge plate 133 and the support arm 119 occurs about the rotation axis $R_5$. Furthermore, in the locking latch assembly 114 of FIGS. 2 to 4, the hinge plate 130 of the hinge 117 is fixedly coupled to an insulating attachment bridge 141 of the corresponding actuator mechanism 120 of the locking latch assembly 114. The configuration of the actuator mechanism 120 of each locking latch assembly of FIGS. 2 to 4 is the same as that shown in FIGS. 14 to 16.

Finally, the configuration of the hinge 118 of each locking latch assembly of FIGS. 2 to 4 is also the same as that shown in FIGS. 10 to 13 except for a few differences. Specifically, the pivoting of the hinge plates 130 and 133 and the support arm 119 and the rotation of the hinge pin 131 occurs about the rotation axis $R_6$. In addition, the hinge plate 130 is fixedly coupled to the left or right side of the locking latch 121 that is adjacent to the hinges 117 and 118, the support arm 119, and the actuator mechanism 120 of the locking latch assembly 114. The hinge plate 130 may be integrally formed with the locking latch 121 at this side.

Alternative Configurations

Referring again to FIG. 1, the self assembly of each filter/lens optical component 106-n just described provides very accurate automated optical alignment of the filter/lens optical component 106-n on the chip 104. Thus, the effort and the inaccuracy of manual optical alignment on the chip 104 is avoided.

Figure 17:
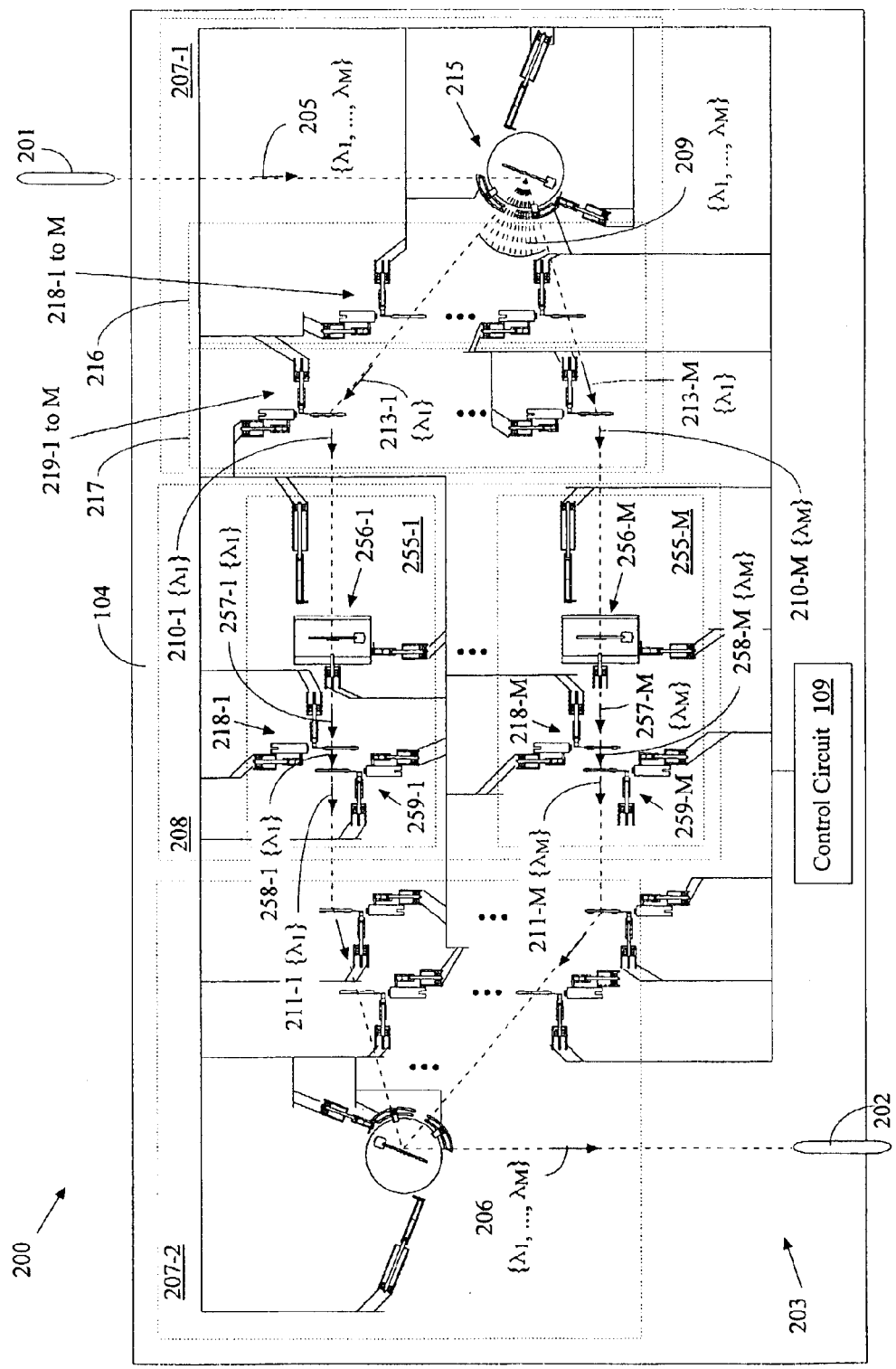
FIG. 17 shows the configuration of a second embodiment of an optical network that comprises an optical input source, an optical output collector, and a WDM power regulator optically coupled between the optical input source and the optical output collector.
Figure 18:
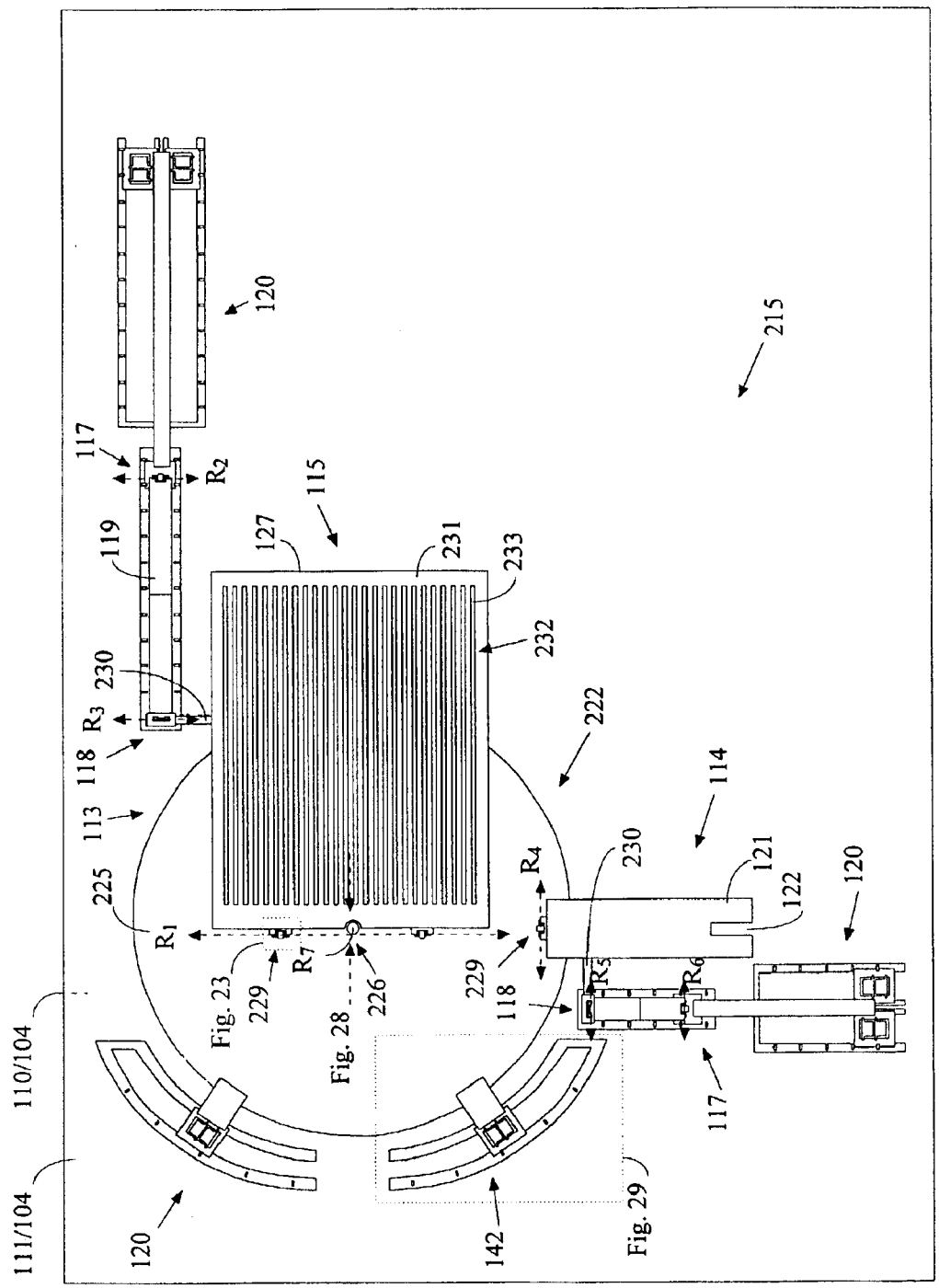
FIGS. 18, 19, 20, and 21 show the configuration of a MEMS grating mirror optical component of a WDM MUX/DMUX of the WDM power regulator of FIG. 17 in its respective unassembled, first partially assembled, second partially assembled, and completely assembled states.
Figure 33:
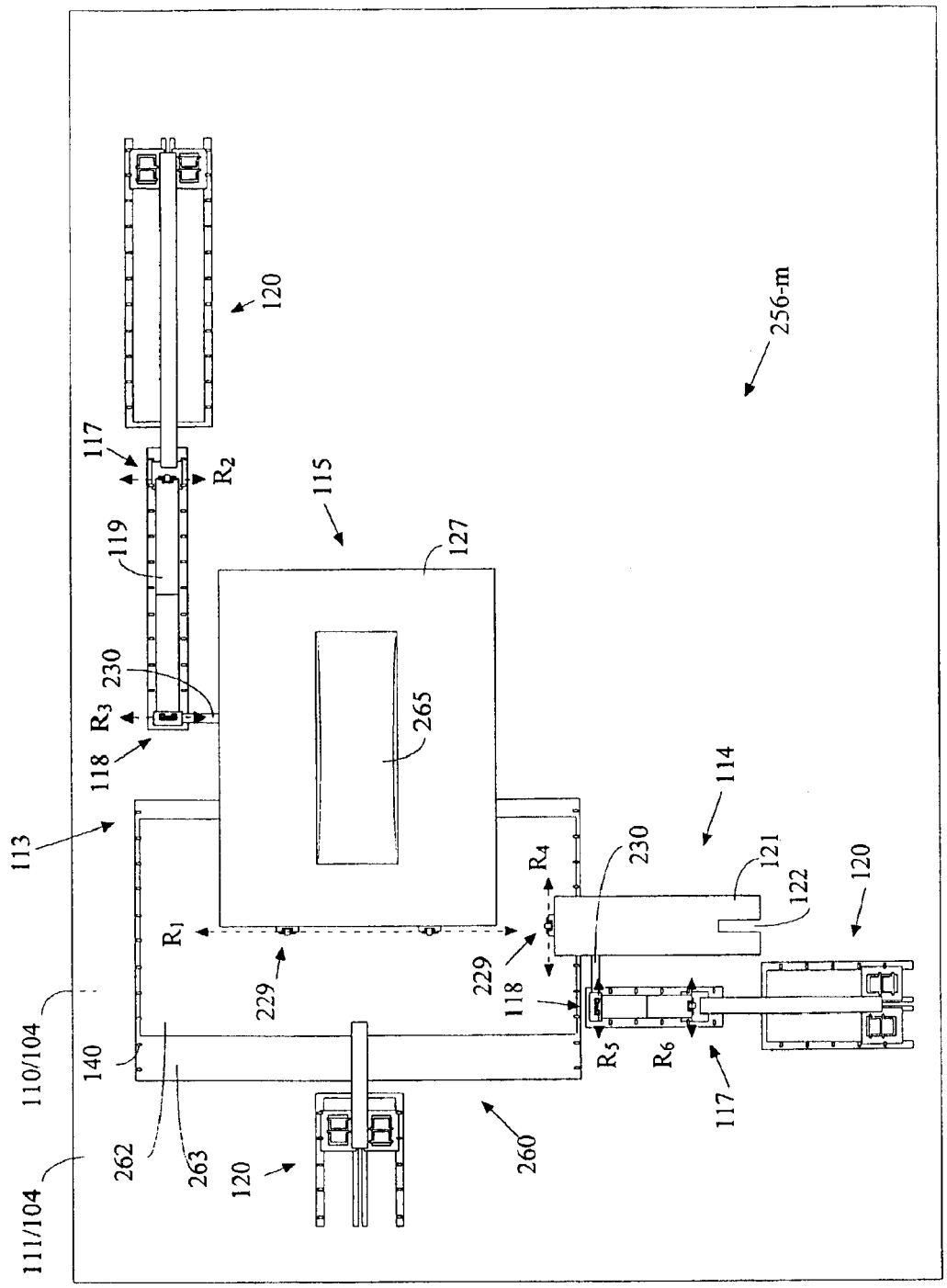
FIG. 33 shows the configuration of a refractive lens optical component of an attenuator in an attenuator array of the WDM power regulator of FIG. 17 in its unassembled state.

However, as those skilled in the art will recognize, each filter/lens optical component 106-n could be configured, operate, and be self assemblable similar to the refractive lens optical component 256-m in FIG. 33 for each attenuator 255-m of FIG. 17. In this case, the filter/lens optical component 106-n could comprise a moveable stage assembly 260. Furthermore, the element structure assembly 113 would be replaced by an element structure assembly that is configured and operates like the refractive lens plate assembly 261 of the refractive lens optical component 256-m, except that the element structure 115 would replace the refractive lens plate 264. Finally, the locking latch assemblies 114 would be replaced by one or more locking latch assemblies 221. In this case, the optical alignment of the filter/lens optical component 106-n could be made even more precise by laterally moving the moveable stage 262 to adjust the position of the element structure 115 of FIGS. 2 to 4.

Filter/Lens Optical Component 105

Referring again to FIG. 1, the filter/lens optical component 105 is configured, operates, and is self assemblable on the chip 104 under the control of the control circuit 109 in a similar manner as that just described for each filter/lens optical component 106-n. Thus, except for the differences mentioned next, the foregoing discussion of each filter/lens optical component 106-n is also applicable to the filter/lens optical component 105.

The filter/lens optical component 105 comprises an element structure 115 like that shown in FIG. 5 for each filter/lens optical component 106-n. The element structure 115 comprises a Fresnel lens optical element 124 like that of each filter/lens optical component 106-n shown in FIG. 5. Referring to FIG. 1, this Fresnel lens directs the input light beam 107-1 to the first filter/lens optical component 106-1.

Turning to FIG. 5 again, the filter/lens optical component 105 may also comprises a bandpass filter optical element 123 similar to that of each filter/lens optical component 106-$n$. Referring back to FIG. 1, this bandpass filter optical element 123 however would be configured to pass all of the wavelengths $\lambda_1, \lambda_2, \lambda_3, \lambda_4, \ldots$, N being multiplexed by the MUX/DMUX 103 so that the input light beam 107-1 includes them all but excludes other wavelengths.

Furthermore, the alignment of the element structure 115 of the filter/lens optical component 105 would be similar to that described earlier for each filter/lens optical component 106-$n$ except that only one optical output collector would be needed. This optical output collector would be located so as to receive an output light beam in the desired optical path that the input light beam 107-1 would have in the MUX/DMUX 103.

Fabrication Process

The MUX/DMUX 103 may be fabricated using a three polysilicon layer process. This of course also means that the filter/lens optical component 105 and the filter/lens optical components 106-1 to N may each be formed with this same three polysilicon layer process.

Referring to FIGS. 5 to 16, in this process, the insulating layer 111 (insulating 0) is first deposited on the substrate 110. The substrate may comprise silicon and the insulating layer may comprise silicon nitride.

Then, a first polysilicon layer (poly 0) is deposited on the insulating layer 111. This polysilicon layer is selectively patterned on the insulating layer 111 to form the base 138 in FIGS. 8 and 9 of each hinge 116, the guide plate 139 in FIGS. 10 to 0.13 of each hinge 117, and the bias lines 150 in FIGS. 14 and 15 of each actuator mechanisms 120.

A first sacrificial layer, such as a PSG (phosphorous silicate glass) like silicon dioxide, is then deposited on the insulating layer 111 and the patterned first polysilicon layer. This sacrificial layer is then selectively etched down to the base 138 of each hinge 116 to form openings for the anchors 134 in FIGS. 8 and 9 (anchor 1) of each hinge 116 and down to the guide plate 139 of each hinge 117 and the bias lines 150 of each actuator mechanism 120 to form openings for the anchors 154 of FIGS. 13 and 15 (anchor 2) of each hinge 117 and each actuator mechanism 120. This sacrificial layer is also selectively etched to form dimples in it for the formation of the contact rails 149 in FIG. 14 of each support frame 143 and the contact rails 149 in FIG. 13 of each hinge plate 130.

A second polysilicon layer (poly 1) is then deposited on the first sacrificial layer and in the openings just mentioned. This polysilicon layer is then selectively patterned to form the hinge plate 130 and the hinge pin 131 in FIGS. 7 to 9 of each hinge 116, the hinge plate 130, the contact rails 149, and the hinge pin 131 in FIGS. 10 to 13 of each hinge 117, the support strip 153 in FIGS. 10 to 12 of each support arm 119, the hinge plate 133 and the locking arm 132 in FIGS. 10 and 12 of each hinge 118, the support frame 143 and the contact rails 149 in FIGS. 14 to 16 of each actuator mechanism 120, the anchors 134 in FIGS. 8 and 9 of each hinge 116, and the lower portions of the anchors 154 of FIGS. 13 and 15 of each hinge 117 and each actuator mechanism 120.

A second insulating layer (insulating 1) is then deposited on the first sacrificial layer and the patterned second polysilicon layer. Like the first insulating layer 111 (insulating 0), this insulating layer may comprise silicon nitride. The second insulating layer is then selectively patterned to form the insulating attachment bridge 141 in FIGS. 14 and 15 of each actuator mechanisms 120.

A second sacrificial layer that is of the same material as the first sacrificial layer is then deposited on the first sacrificial layer, the patterned second polysilicon layer, and the patterned second insulating layer. The second sacrificial layer is selectively etched down to the lower portions of the anchors 154 in FIGS. 13 and 15 of each hinge 117 and each actuator mechanism 120 to provide openings for the upper portions of these anchors 154. The second sacrificial layer is also selectively etched down to the hinge plate 130 and the hinge pin 131 in FIGS. 8 and 9 of each hinge 116, the hinge plate 130 and the hinge pin 131 in FIGS. 11 and 12 of each hinge 117, the support strip 153 in FIGS. 11 and 12 of each support arm 119, the hinge plate 133 and the locking arm 132 in FIGS. 11 and 12 of each hinge 118, and the support frame 143 in FIG. 15 of each actuator mechanism 120 to provide openings for the formation of the corresponding vias 148 in FIGS. 8, 9, 11, 12, and 15 of each hinge 116, 117, and 118, each support arm 119, and each actuator mechanism 120. The second sacrificial layer is further selectively etched to form dimples in the second sacrificial layer for the formation of the bushing 147 in FIGS. 9 and 10 of each SDA 144.

A third polysilicon layer (poly 2) is then deposited on the second sacrificial layer and in the openings just mentioned. This polysilicon layer is then selectively patterned to form the upper portions of the anchors 154 just mentioned, the vias 148 just mentioned, the hinge plate 133 and locking arm 132 in FIGS. 7 to 9 of each hinge 116, the support plate 127 in FIGS. 5, 8, and 9 including the Fresnel pattern 128 in FIG. 5 of each element structure 115, each locking latch 121 including the corresponding slot 122 in FIG. 6, the hinge plate 133 and locking arm 132 in FIGS. 10 to 12 of each hinge 117, the hinge plate 130 and hinge pin 131 in FIGS. 10 to 12 of each hinge 118, the support strip 152 in FIGS. 10 to 12 of each support arm 119, the guiding overhangs 0.140 in FIGS. 13 and 14 of each hinge 117 and each actuator mechanism 120, the SDAs 144 including the bushings 147 in FIGS. 15 and 16 of each actuator mechanism 120.

A third sacrificial layer is then deposited on the second sacrificial layer and the patterned third polysilicon layer. This third sacrificial layer is of the same material as the first and second sacrificial layers. This sacrificial layer is then selectively etched down to the support plate 127 in FIG. 5 of each element structure 115 to form an opening over the support plate 127 while the gaps in the support plate 127 caused by the Fresnel pattern 128 are still filled with the sacrificial layer.

Then, alternating layers of high and low reflectivity thin film materials are deposited on the third sacrificial layer and in the opening over the support plate 127 in FIG. 5 of each element structure 115. These thin film layers are then selectively patterned to form the thin film material plates 125 and 126 on the support plate 127 of each element structure 115.

Finally, the first, second, and third sacrificial layers are removed. This frees all of the hinges 116, 117, and 118, the element structures 115, the locking latchs 121, and the actuator mechanisms 120 in FIGS. 2 to 4 for movement in the manner described earlier.

Alternative Embodiments

In FIG. 1, the MUX/DMUX 103 is used in the optical network 100 for demultiplexing. However, those skilled in the art will recognize that the MUX/DMUX 103 could also be used for multiplexing. In this case, the configuration and operation of the optical network 100 would be the reciprocal of that just discussed.

Second Exemplary Embodiment

FIG. 17 shows a second exemplary embodiment of the present invention, namely another optical network 200. The optical network 200 comprises an optical input source 201, and optical output collector 202, and a WDM power regulator (i.e., equalizer) 203 implemented on the integrated MEMS chip 104.

The optical input source 201 is configured to transmit an input light beam 205 having multiple wavelengths $\lambda_1$ to $\lambda_M$, where M≧2. The optical input source 201 may comprise an optical fiber, a laser, or other light source.

The WDM power regulator 203 is optically coupled to the optical input source 201 to receive the input light beam 205. The WDM power regulator 203 is monolithically fabricated on the chip 104 and is self assemblable on and reconfigurable on the chip 104 uder the control of the control circuit 109. The WDM power regulator is configured to separately regulate the respective power levels of the wavelengths $\lambda_1$ to $\lambda_M$ of the input light beam 205. This produces an output light beam 206 with the wavelengths $\lambda_1$ to $\lambda_M$ at respective regulated power levels.

The optical output collector 202 is optically coupled to the WDM power regulator 203 to receive the output light beam 206. The optical output collector 202 is configured to transmit the output light beam 206 and may comprise an optical fiber or other light collector.

In order to perform the power regulation just described, the WDM power regulator 203 comprises MEMS MUX/DMUXs 207-1 and 207-2 and a MEMS attenuator array 208 that are all integrated on the chip 104. In fact, the MUX/DMUXs 207-1 and 207-2 and the attenuator array 208 are all monolithically fabricated on the chip 104 and are all self assemblable on and reconfigurable on the chip 104 under the control of the control circuit 109.

The MUX/DMUX 207-1 is optically coupled to the optical input source 201 to receive the input light beam 205. The MUX/DMUX 207-1 is configured on the chip 104 to demultiplex the input light beam 205 into individual light beams 210-*l* to M with respective wavelengths $\lambda_1$ to $\lambda_M$.

The attenuator array 208 is optically coupled to the MUX/DMUX 207-1 to receive the individual light beams 210-1 to M. The attenuator array 208 is configured to separately regulate the power levels of the individual light beams 210-1 to M by separately attenuating them. This produces the separately regulated light beams 211-1 to M with respective wavelengths $\lambda_1$ to $\lambda_M$ and respective regulated power levels.

The MUX/DMUX 207-2 is optically coupled to the attenuator array 208 to receive the separately regulated light beams 211-1 to M. The MUX/DMUX 207-2 is configured on the chip 104 to multiplex the separately regulated light beams 211-1 to M into the single output light beam 206 comprising the wavelengths $\lambda_1$ to $\lambda_M$ at respective regulated power levels. The optical output collector 202 is optically coupled to the MUX/DMUX 207-2 to receive the output light beam 206.

The WDM power regulator 203 also comprises a control circuit 109. The control circuit 109 is integrated on the chip 104 along with the MUX/DMUXs 207-1 and 207-2 and the attenuator array 208. However, in an alternative configuration for the WDM power regulator 203, the control circuit 109 could be located off the chip 104. The MUX/DMUXs 207-1 and 207-2 and the attenuator array 208 are each self assemblable on and reconfigurable on the chip 104 under the control of the control circuit 109. Thus, the entire WDM power regulator 203 is itself self assemblable on and reconfigurable on the chip 104 under the control of the control circuit 109.

MUX/DMUX 207-1

Still referring to FIG. 17, the MUX/DMUX 207-1 comprises a MEMS grating mirror optical component 215, a MEMS gate filter array 216, and a MEMS refractive lens array 217. The grating mirror optical component 215, the gate filter array 216, and the refractive lens array 217 are all monolithically fabricated on the chip 104 and are all self assemblable on the chip 104 under the control of the control circuit 109.

In its completely assembled state, the grating mirror optical component 215 is optically coupled to the optical input source 201 to receive the input light beam 205. The grating mirror optical component 215 is reconfigurable on the chip 104 under the control of the control circuit 109. This is due to the fact that the grating mirror optical component 215 is configured to be rotated to a selected position to spread the input light beam 205 out into its spectrum of wavelengths at different angles to produce a wide spectrum light beam 209 with these wavelengths at the different angles. These wavelengths of course include the wavelengths $\lambda_1$ to $\lambda_M$.

The gate filter array 216 comprises MEMS gate filter optical components 218-1 to M for passing only the wavelengths $\lambda_1$ to $\lambda_M$ of the wide spectrum light beam 209 to produce the filtered light beams 213-1 to M with the respective wavelengths $\lambda_1$ to $\lambda_M$. The gate filter optical components 218-1 to M are all monolithically fabricated on the chip 104 and are all self assemblable on the chip 104 under the control of the control circuit 109. In its completely assembled state, each gate filter optical component 218-*m*, where m=1 to M, is configured to pass a corresponding wavelength $\lambda_m$ at a corresponding angle from among the other wavelengths of the wide spectrum light beam 209 that are around the wavelength $\lambda_m$. This results in a corresponding filtered light beam 213-*m* with the corresponding wavelength $\lambda_m$ at a corresponding angle.

The refractive lens array 217 comprises MEMS refractive lens optical components 219-1 to M for re-focusing the filtered light beams 213-1 to M to produce the individual light beams 210-1 to M with the respective wavelengths $\lambda_1$ to $\lambda_M$. The refractive lens optical components 219-1 to M are all monolithically fabricated on the chip 104 and are all self assemblable on the chip 104 under the control of the control circuit 109. In its completely assembled state, each refractive lens optical component 219-*m* is configured to re-focus a corresponding filtered light beam 213-*m* to produce the corresponding individual light beam 210-*n* with the wavelength $\lambda_m$.

Optical Grating Mirror Component 215 FIGS. 18, 19, 20, and 21 show the configuration of the grating mirror optical component 215 in its unassembled, first partially assembled, second partially assembled, and completely assembled states, respectively. Similar to each filter/lens optical component 106-*n* of FIGS. 2, 3, and 4, the grating mirror optical component 215 is monolithically fabricated on the chip 104 and self assemblable on the chip 104 under the control of the control circuit 109.

Like the lens/filter optical component 106-*n* of FIGS. 2 to 4, the grating mirror optical component 215 comprises an element structure assembly 113 and a locking latch assembly 114. However, the grating mirror optical component 215 also comprises a moveable stage assembly 222. The grating mirror optical component 215 further comprises corresponding portions of a semiconductor substrate 110 and an insulating layer 111 of the chip 104 of FIG. 16. The element structure assembly 113, the locking latch assembly 114, and moveable stage assembly 222 are formed on this portion of the insulating layer 111.

The moveable stage assembly 222 comprises a moveable stage 225, a micro-mechanical rotation hinge 226, and an actuator mechanism 120. The moveable stage 225 is configured so that it can be rotatably moved by the actuator mechanism 120. Specifically, the moveable stage 225 is rotatably coupled to the insulating layer 111 by the rotation hinge 226 so that it can rotate about the rotation axis $R_7$ of the rotation hinge 226 when the grating mirror optical component 215 is in its completely assembled state. The actuator mechanism 120 is fixedly coupled to the moveable stage 225 and can be controlled by the control circuit 109 of FIG. 17 to move along an arc so as to cause the moveable stage 225 to rotate about the rotation axis $R_7$ when the grating mirror optical component 215 is in its completely assembled state.

With respect to on-chip assembly of the grating mirror optical component 215, the element structure assembly 113 is configured and operates similar to the element structure assembly 113 of the filter/lens optical component 106-$n$ of FIGS. 2 to 4 except for the differences discussed next. The element structure assembly 113 here comprises micromechanical hinges 229 instead of the hinges 116 and comprises an additional support arm 230. The element structure 115 is pivotally coupled to the moveable stage 225 of the moveable stage assembly 222 by the hinges 229. Here, the support arm 230 is pivotally coupled to the support arm 119 by the hinge 118. A portion of the support arm 230 extends underneath and supports the left or right side of the element structure 115 that is adjacent to the hinges 117 and 118, the support arm 119, and the actuator mechanism 120 of the element structure assembly 113 without being physically coupled to the element structure 115. Thus, the hinges 229, 117, and 118 and the support arms 119 and 230 cooperatively translate the forward lateral movement of the actuator mechanism 120 into pivoting movement by the element structure about the rotation axis $R_1$ of the hinges 229. This is done under the control of the control circuit 109 of FIG. 17 until the element structure 115 has been moved from its lying position in FIG. 18 in the unassembled state of the grating mirror optical component 215 to its upright position in FIG. 19 in the first partially assembled state of the grating mirror optical component 215. Although the element structure assembly 113 is shown comprising two hinges 229, those skilled in the art will recognize that one or more hinges 229 could be used.

Proper alignment of the element structure 115 in its upright position is done in a similar manner to that described earlier for the element structure 115 of each filter/lens optical component 106-$n$. An optical input source is located so as to direct an input light beam at the element structure 115 in the desired optical path that the input light beam 205 would have in the MUX/DMUX 207-1. Furthermore, an optical output collector would then be located so as to receive a wide spectrum output light beam in the desired optical path that the wide spectrum light beam 209 would have in the MUX/DMUX 207-1. The optical spectrum of the output light beam would then be analyzed with a spectrum analyzer. The pivoting of the element structure 115 would then be controlled until the optical spectrum provided by the spectrum analyzer indicated that the element structure 115 was in the desired upright position. As those skilled in the art will recognize, other methods could also be used to properly align the element structure 115.

Referring again to FIGS. 18 to 21, the locking latch assembly 114 is configured and operates like each locking latch assembly 114 of the filter/lens optical component 106-$n$ of FIGS. 2 to 4 except for the following differences. Like the element structure assembly 115 of the grating mirror optical component 215, the locking latch assembly 114 here comprises a hinge 229 instead of a hinge 116 and also comprises an additional support arm 230. The locking latch 121 is pivotally coupled to the moveable stage 225 of the moveable stage assembly 222 by the hinge 229. The slot 122 of the locking latch 121 is sized here to closely receive the corresponding left or right side of the element structure 115 in the locking position of the locking latch 121. Similar to the element structure assembly 113, the support arm 230 is pivotally coupled to the support arm 119 by the hinge 118. A portion of the support arm 230 extends underneath and supports the left or right side of the locking latch 121 that is adjacent to the hinges 117 and 118, the support arm 119, and the actuator mechanism 120 of the locking latch assembly 114 without being physically coupled to the locking latch 121. The hinges 229, 117, and 118 and the support arm 119 therefore cooperatively translate the lateral forward movement of the actuator mechanism 120 into pivoting movement by the locking latch 121 about the rotation axis $R_4$ of the hinges 229. This is done under the control of the control circuit 109 of FIG. 17 until the locking latch 121 has been moved from its lying position in FIG. 19 in the first partially assembled state of the grating mirror optical component 215 to its locking position shown in FIG. 20 in the second partially assembled state of the grating mirror optical component 215.

Figure 21:
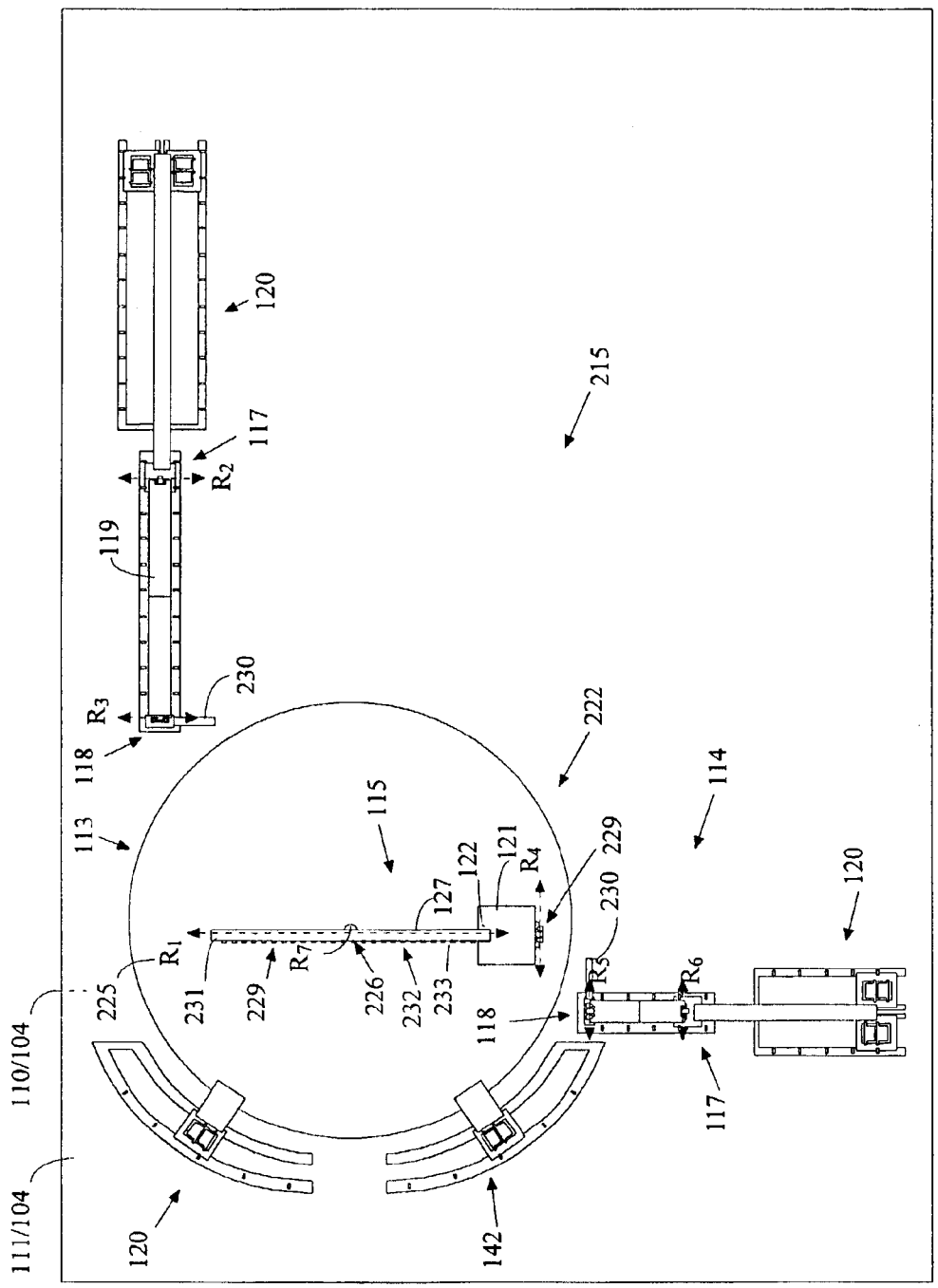

Then, under the control of the control circuit 109, the actuator mechanism 120 of each of the element structure and locking latch assemblies 113 and 114 is laterally moved backward in the manner shown in FIG. 21. This removes the hinges 117 and 118 and the support arms 119 and 230 of each of the element structure and locking latch assemblies 113 and 114 away from the moveable stage assembly 222 so that the moveable stage 225 can freely rotate about the rotation axis $R_7$. As a result, the grating mirror optical component 215 is then in its completely assembled state.

Similar to that described earlier for the filter/lens optical component 106-$n$ of FIGS. 2 to 4, the locking latch assembly 114 could be eliminated from the configuration of the grating mirror optical component 215 if the element structure 115 is stable enough for proper optical alignment in its upright position without the locking latch assembly 114. Or, more than one locking latch assembly 114 may be used to add even more stability.

Referring back to FIG. 17, in its completely assembled state, the grating mirror optical component 215 is reconfigurable under the control of the control circuit 109 so that it can be properly tuned to spread the input light beam 205 out into its constituent wavelengths including the wavelengths $\lambda_1$ to $\lambda_M$ to produce the wide spectrum light beam 209. Specifically, under the control of the control circuit 109, the actuator mechanism 120 of the moveable stage assembly 222 can be controlled to move along an arc so as to cause the moveable stage 225 to rotate about the rotation axis $R_7$ and properly position the element structure 115 in the optical path of the input light beam 205.

Element Structure Assembly 113

Figure 22:
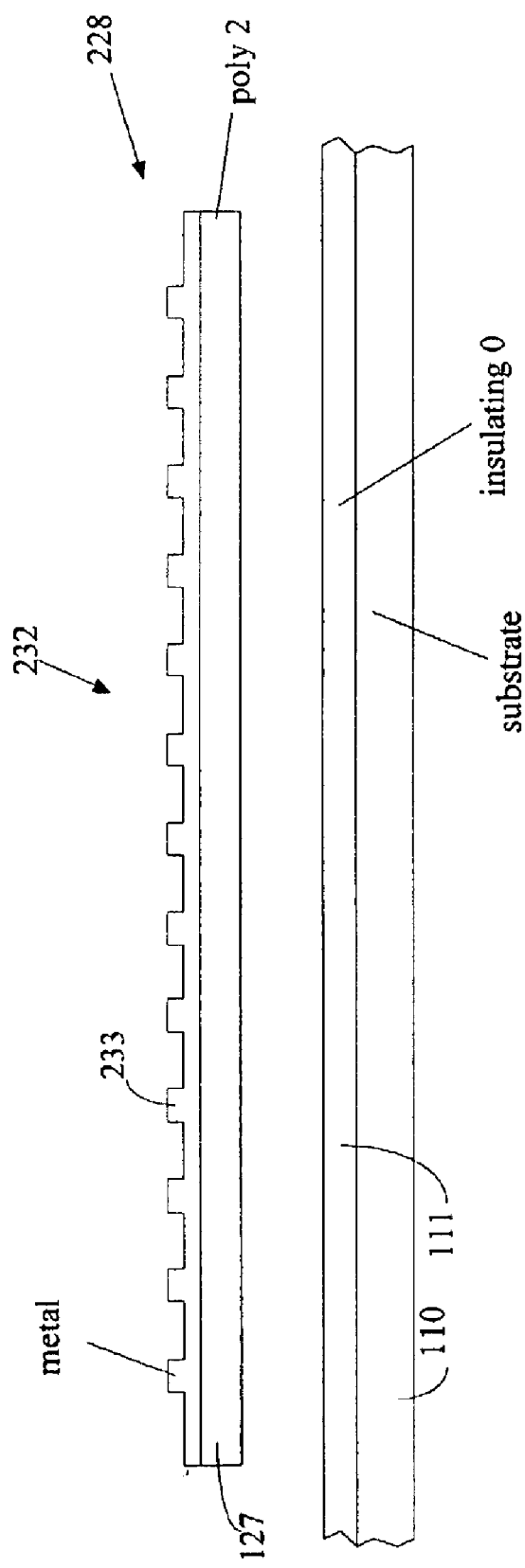
FIG. 22 shows the configuration of an element structure of an element structure assembly of the grating mirror optical component of FIGS. 18 to 21.

FIG. 22 shows the configuration of the element structure 115 of the element structure assembly 113 in FIGS. 18 to 21 of the grating mirror optical component 215. Similar to the element structure 115 of FIG. 5 of each filter/lens optical component 106-$n$ of FIGS. 2 to 4, the element structure 115 comprises a support plate 127. However, here, the element structure 115 comprises a grating mirror optical element 232 formed on the support plate 127. The grating mirror optical element 232 comprises a metal plate 231 with vertical metal strips 233 formed on the support plate 127. Alternatively, the support plate 127 could be etched to form a pattern of vertical strips in the support plate 127 coated with metal to produce the grating mirror optical element 232. The grating mirror optical element 232 is therefore configured to optically interact with the input light beam 205 of FIG. 17 to spread it out into its constituent wavelengths including the wavelengths $\lambda_1$ to $\lambda_M$ to produce the wide spectrum light beam 209.

Figure 23:
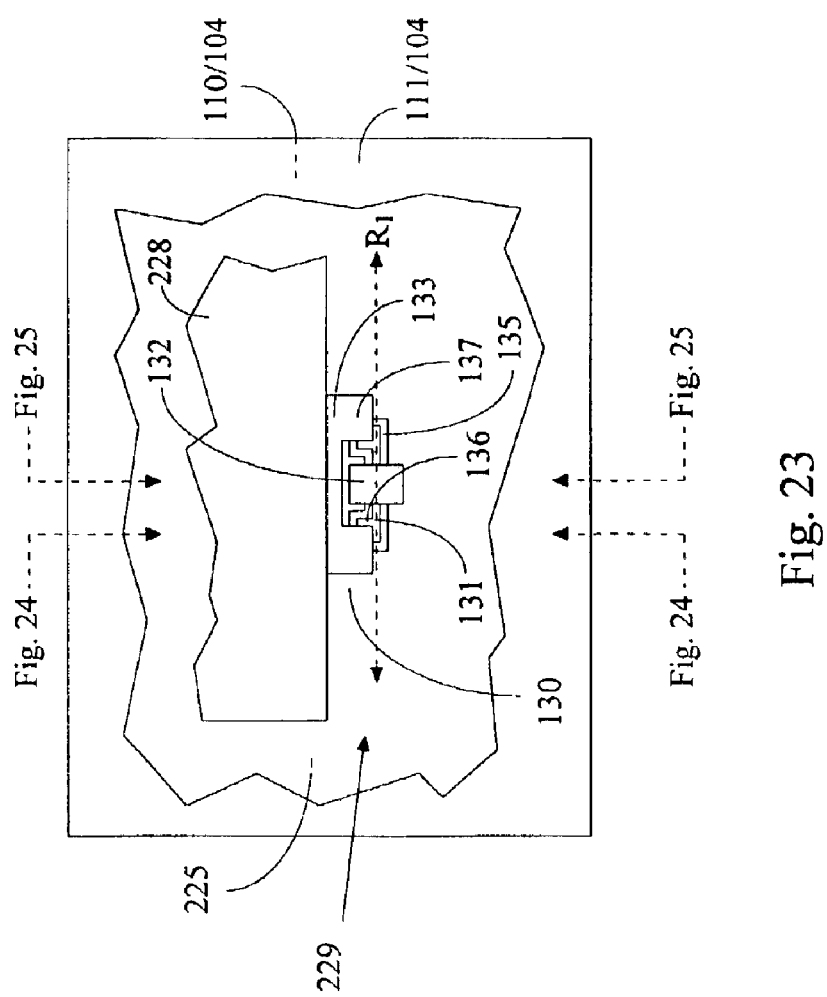
FIGS. 23 to 25 show the configuration of each hinge of the element structure assembly of the grating mirror optical component of FIGS. 18 to 21.
Figure 24:
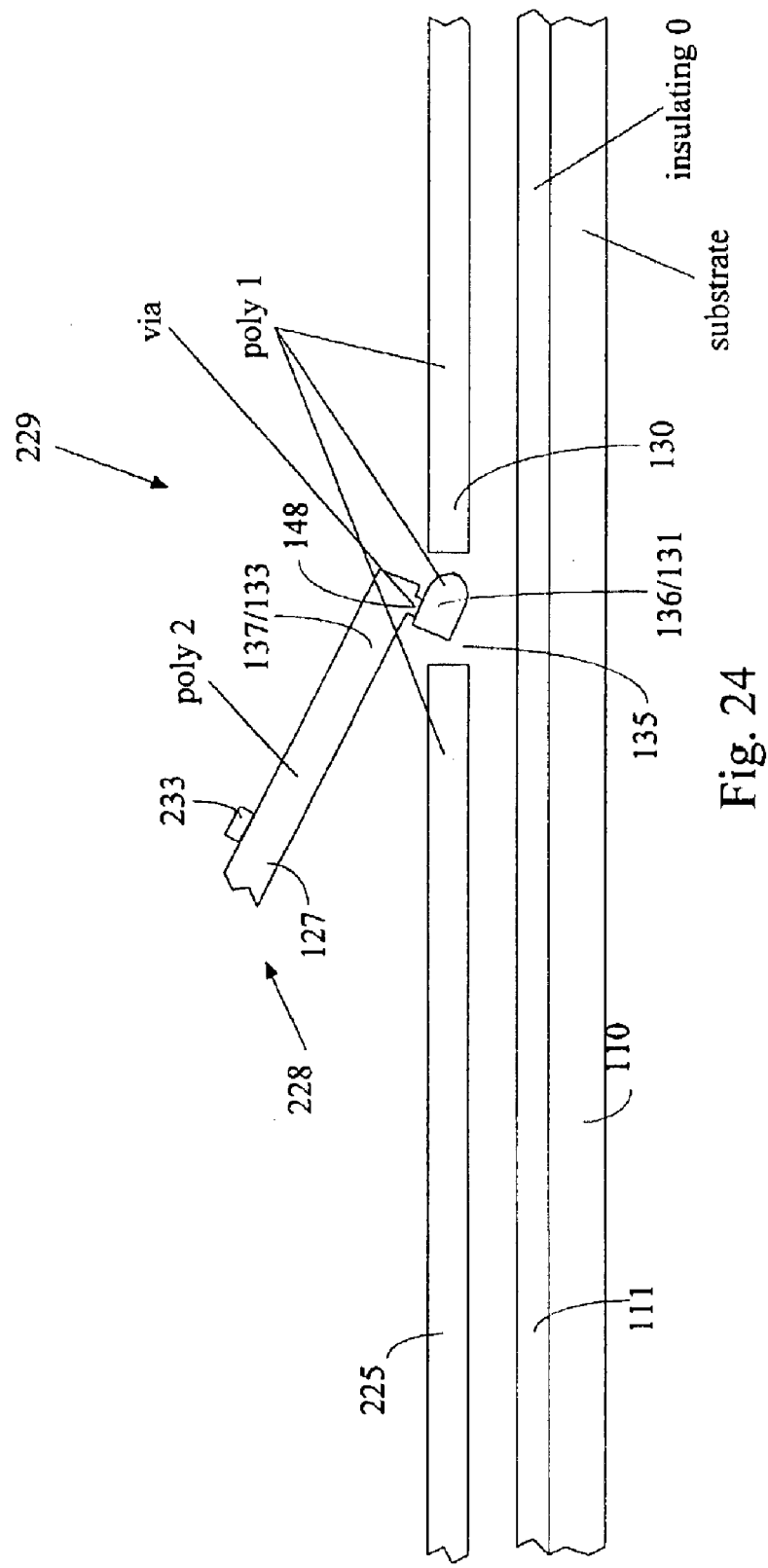
Figure 25:
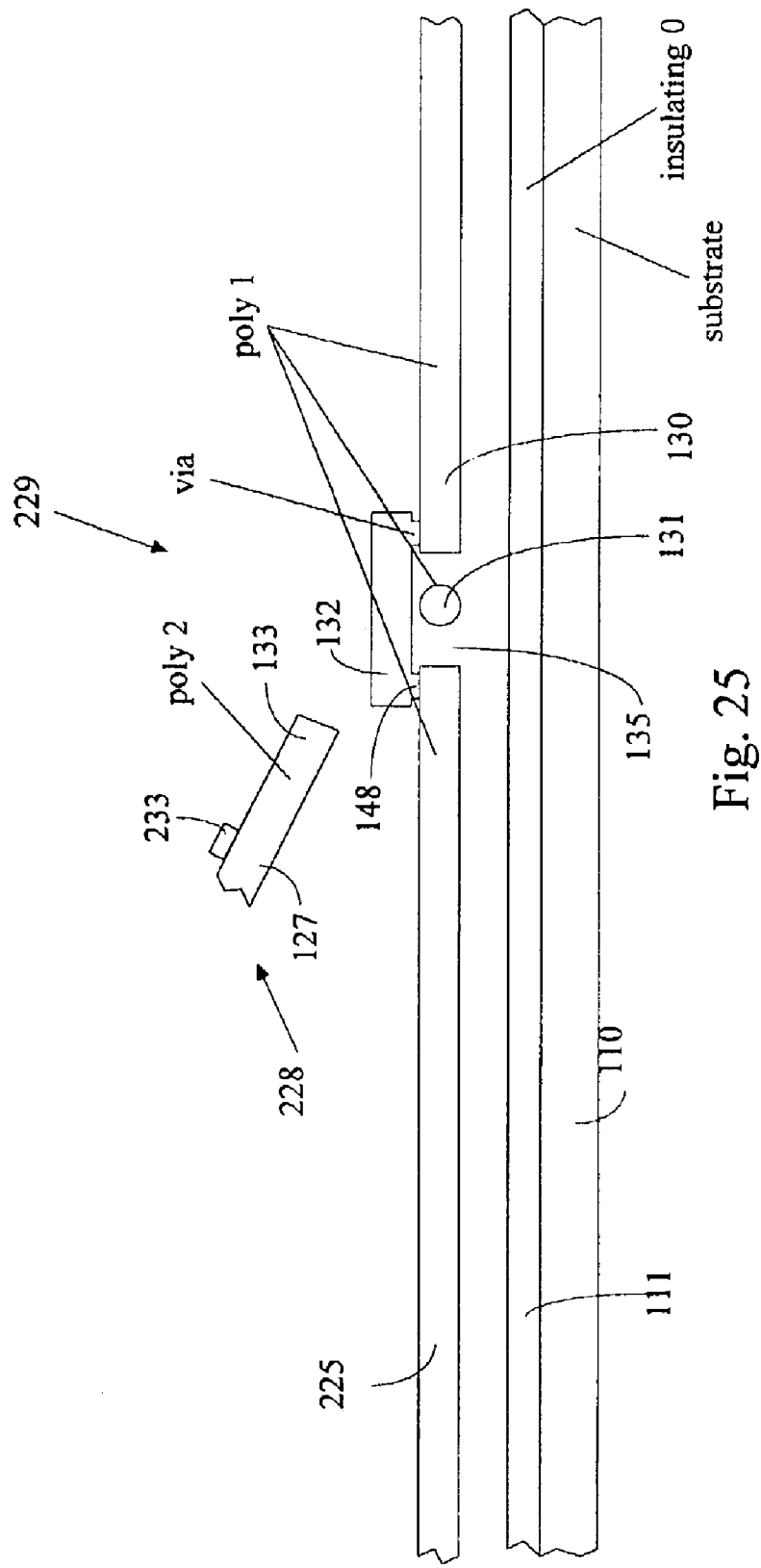

Each hinge 229 of the element structure assembly 113 of FIGS. 18 to 21 is configured and operates similar to each hinge 116 shown in FIGS. 7 to 9 of each filter/lens optical component 106-$n$ of FIGS. 2 to 4. However, as shown in FIGS. 23 to 25, there are a few significant differences that will be discussed next. Each hinge 229 does not include a base 138 and anchors 134 since its hinge plate 130 is fixedly coupled to the moveable stage 225 of the moveable stage assembly 222. In fact, the hinge plate 130 may be integrally formed with the moveable stage 225. Furthermore, the hinge plate 133 is fixedly coupled to and may be integrally formed with the support plate 127 of the element structure 115.

The hinges 117 and 118, the support arm 119, and the actuator 120 of the element structure assembly 113 have a similar configuration and operation to those described earlier and shown in FIGS. 10 to 13 for each filter/lens optical component 106-$n$ of FIGS. 2 to 4. However, referring to FIGS. 26 and 27, the element structure assembly 113 also comprises an additional support arm 230.

This support arm 230 is fixedly coupled to the hinge plate 130 of the hinge 118 by a via 148. A portion of the support arm 230 extends underneath and supports the left or right side of the element structure 115 that is adjacent to the hinges 117 and 118, the support arm 119, and the actuator mechanism 120 of the element structure assembly 113 without being physically coupled to the element structure 115.

Locking Latch Assembly 114

The locking latch 121 of the locking latch assembly 114 of the grating mirror optical component 215 of FIGS. 18 to 21 has a similar configuration and operation to that shown in FIG. 6 for the filter/lens optical component 106-$n$ of FIGS. 2 to 4. However, as mentioned earlier, the slot 122 of the locking latch 121 here is sized to closely receive the corresponding left or right side of the element structure 115 in the locking position of the locking latch 121.

Each hinge 229 of the locking latch assembly 114 of FIGS. 18 to 21 is configured and operates similar to that shown in FIGS. 23 to 25 except for one major difference. Here, the hinge plate 133 is fixedly coupled to and may be integrally formed with the locking latch 121. And, pivoting of the hinge plate 133 and the locking latch 121 and rotation of the hinge pin 131 occurs bout the rotation axis $R_4$.

The hinges 117 and 118, the support arm 119, and the actuator 120 of the locking latch assembly 114 have a similar configuration and operation to those described earlier and shown in FIGS. 10 to 13 for each filter/lens optical component 106-$n$ of FIGS. 2 to 4. However, similar to the element structure assembly 113, the locking latch assembly 114 also comprises an additional support arm 230 that is configured and operates similar to that shown in FIGS. 26 and 27. However, here, a portion of the support arm 230 extends underneath and supports the left or right side of the locking latch 121 that is adjacent to the hinges 117 and 118, the support arm 119, and the actuator mechanism 120 of the locking latch assembly 114 without being physically coupled to the locking latch 121.

Moveable Stage Assembly 222

Figure 28:
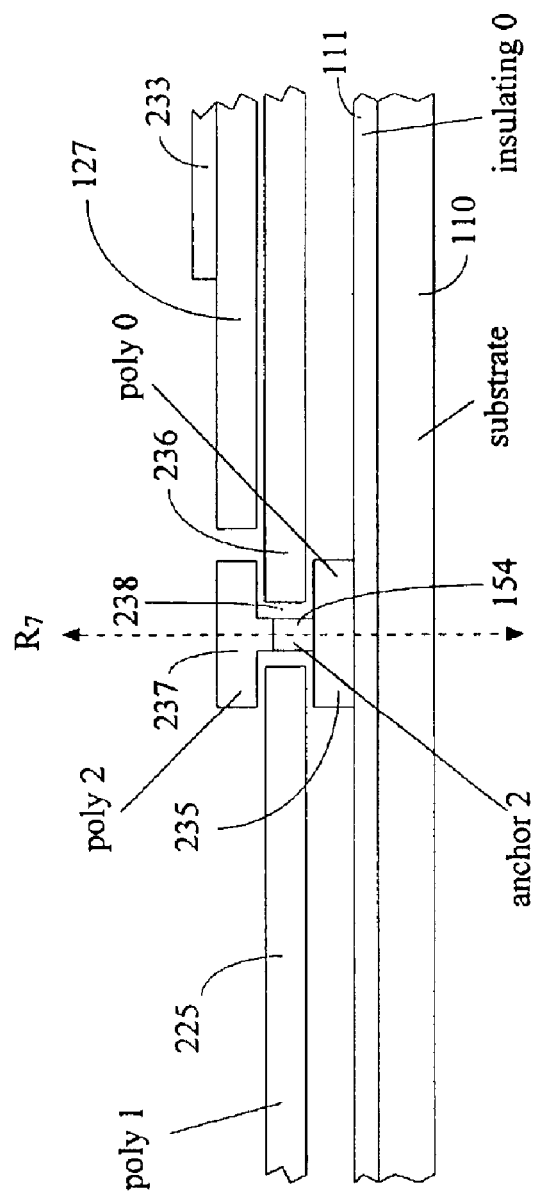
FIG. 28 shows the configuration of the rotation hinge of the moveable stage assembly of the grating mirror optical component of FIGS. 18 to 21.

FIG. 28 shows the configuration of the rotation hinge 226. The rotation hinge 226 comprises a lower bracket 235, a middle section 236, an anchor 154, and an upper bracket 237. The lower bracket 235 is fixedly coupled to the insulating layer 111. The middle section 236 is oriented in a horizontal plane and also has an opening 238 that is oriented in the horizontal plane. The anchor 154 is located within the opening 238 and extends down along the rotation axis $R_7$ of the rotation hinge 226. This anchor 154 fixedly couples the lower and upper brackets 235 and 237 together. The upper and lower brackets 235 and 237 are oriented parallel to the horizontal plane and have dimensions (i.e., cross sectional widths) parallel to the plane that are greater than the dimension (i.e., diameter) of the opening 238. As a result, movement of the middle section 236 relative to the lower and upper brackets 235 and 237 is limited to rotation in the horizontal plane about the rotation axis $R_7$. Thus, the anchor 154 serves as the hinge pin of the rotation hinge 226.

The moveable stage 225 is fixedly coupled to the middle section 236 of the rotation hinge 226. In fact, the moveable stage 225 may be integrally formed with the middle section 236. This enables the moveable stage 225 to rotate about the rotation axis $R_7$ of the rotation hinge 226 as the middle section 236 rotates about the rotation axis $R_7$.

Figure 29:
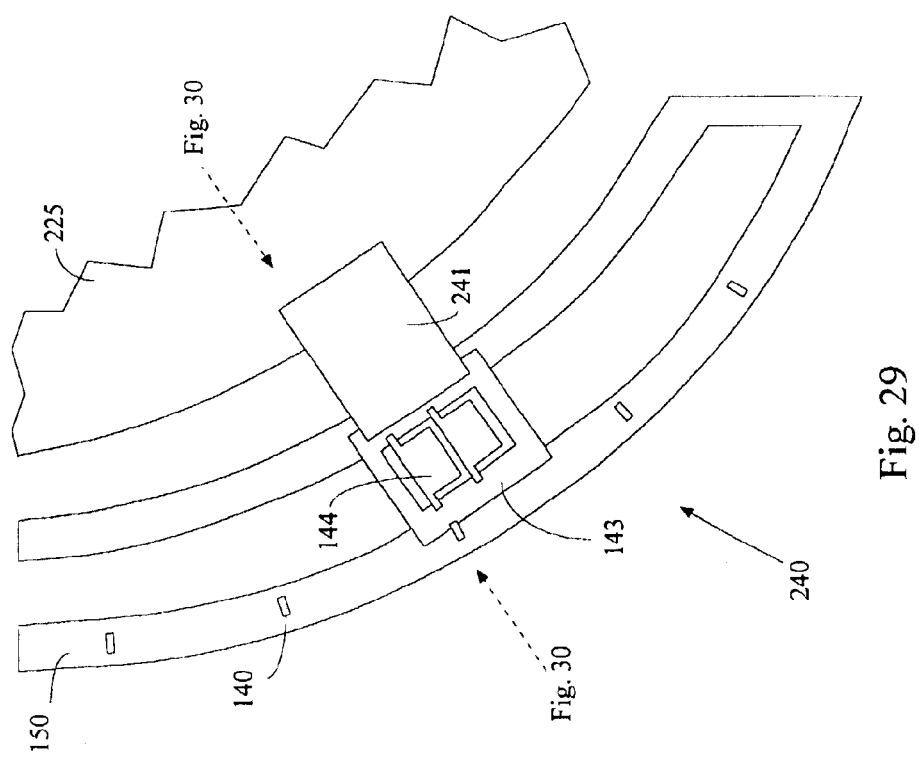
FIGS. 29 and 30 show the configuration of each actuator sub-mechanism of the moveable stage assembly of the grating mirror optical component of FIGS. 18 to 21.
Figure 30:
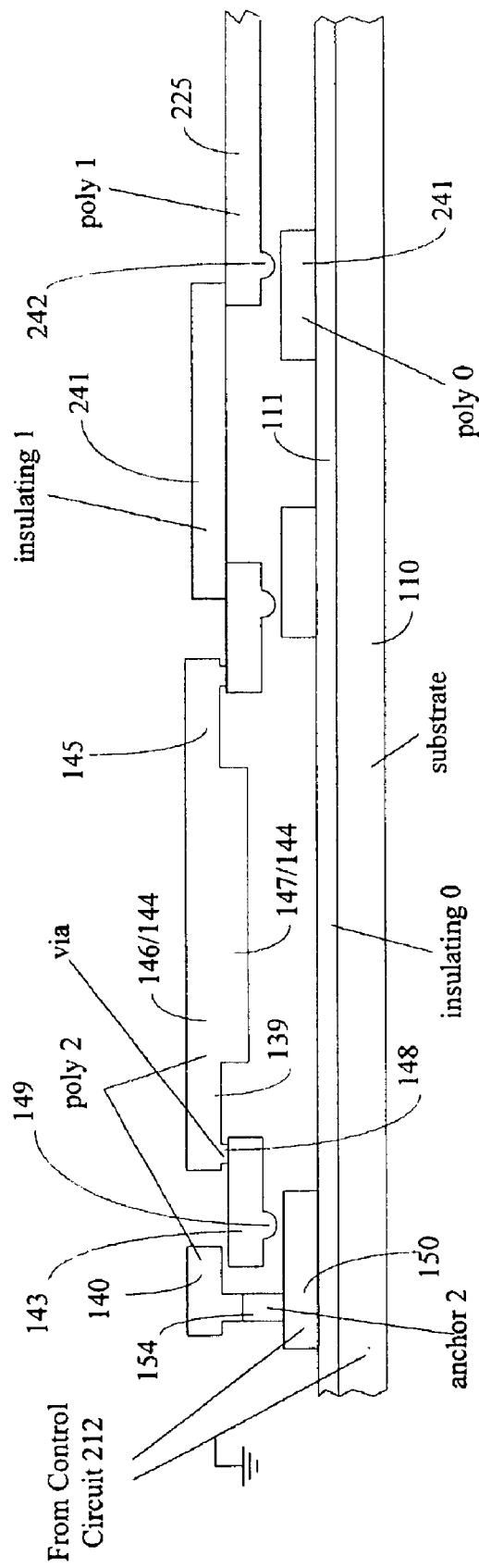

Referring back to FIGS. 18 to 21, the actuator mechanism 120 of the grating mirror optical component 215 comprises two actuator sub-mechanisms 142. FIGS. 29 and 30 show the configuration of each actuator sub-mechanism 120 of the grating mirror optical component 215. Except for a few differences to be discussed next, each actuator sub-mechanism 120 is configured and operates similar to the actuator sub-mechanism 142 shown in FIGS. 14 to 16 and described earlier for each filter/lens optical component 106-$n$ of FIGS. 2 to 4. One of the actuator sub-mechanisms 142 is configured for clockwise movement along an arc and the other is configured for counter clockwise movement along the arc. Thus, the bias lines 150 and the contact rails 149 are arc shaped so that eac actuator sub-mechanism 142 can travel along an arc. Furthermore, in the actuator sub-mechanism 142 configured for clockwise movement, the SDAs 144 are aligned for clockwise movement. Conversely, the SDAs 144 are aligned for counter clockwise movement in the actuator sub-mechanism 142 configured for counter clockwise movement. Furthermore, each actuator sub-mechanism 142 includes an insulating attachment bridge 141 that fixedly couples the support frame 143 of the actuator sub-mechanism 142 and the moveable stage 225.

The moveable stage assembly 222 further comprises a guide strip 241 that is ring shaped. Correspondingly, the moveable stage 225 comprises a contact rail 242 that is ring shaped. The contact rail 242 slides on the guide strip 241 as the moveable stage 225 rotates. The contact rail 242 therefore enables the moveable stage 225 to rotatably slide on the guide strip 241 with minimal friction and stiction. The contact rail 242 may be continuous or may comprise a circle of protrusions or bumps.

Referring back to FIGS. 18 to 21, the moveable stage assembly 222 could further comprise guiding overhangs 140 similar to those of the moveable stage assembly 260 of FIG. 33. In this case, the guide strip 241 of FIG. 30 would extend out past the circumference of the moveable stage 225 so that the guiding overhangs 140 could be fixedly coupled to the guide strip 241 with anchors 154.

Furthermore, the moveable stage 225 could be crescent moon shaped with an opening that is closely sized to fit around the left and right sides of the element structure 115 and extends into the moveable structure until just before the rotation hinge 226 and the hinges 229 of the element structure assembly 113. This would ensure that the portion of the support plate 127 under the metal strips 233 of the grating mirror optical element 232 would be made flat during fabrication. As a result, the metal strips 233 of the grating mirror optical element 232 would be formed on a flat surface.

Gate Filter Array 216

As mentioned earlier, the gate filter array 216 of FIG. 17 comprises MEMS gate filter optical components 218-1 to M. Each gate filter optical component 218-$m$ is configured to pass a corresponding wavelength $\lambda_m$ from among the other constituent wavelengths of the input light beam 205 that are around the wavelength $\lambda_m$. Like each filter/lens optical component 106-$n$ of FIGS. 2 to 4, each gate filter optical component 218-$m$ is monolithically fabricated on the chip 104 and is self assemblable on the chip 104 under the control of the control circuit 109. Furthermore, the configuration, operation, and self assembly of each gate filter optical component 218-$m$ is similar to that of each filter/lens optical component 106-$n$ except for the differences that are discussed next.

Figure 31:
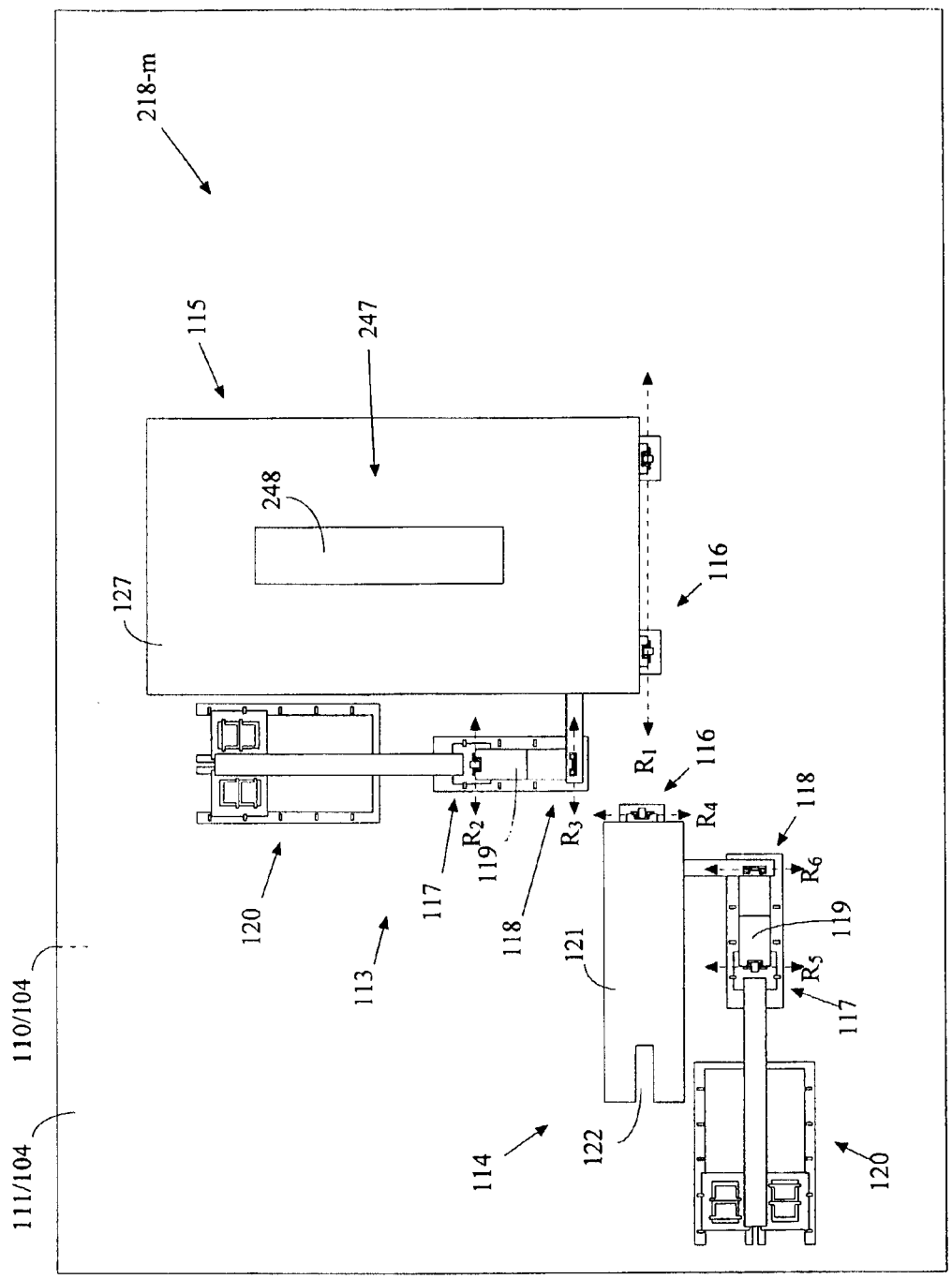
FIG. 31 shows the configuration of each gate filter optical component of the WDM MUX/DMUX of the WDM power regulator of FIG. 17 in its unassembled state.

FIG. 31 shows the configuration of each gate filter optical component 218-$m$ in its unassembled state. Similar to each lens/filter optical component 106-$n$, each gate filter optical component 218-$m$ comprises an element structure assembly 113 and a locking latch assembly 114. Here, however, the element structure 115 comprises a support plate 127 and a gate filter optical element 247 formed on/in the support plate 127. Specifically, the gate filter optical element 247 comprises a slot 248 formed in the support plate 127. Furthermore, the slot 122 of the locking latch 121 of the locking latch assembly 114 is sized to closely receive the corresponding left or right side of the element structure 115 in the locking position of the locking latch 121. The gate filter optical element 247 is configured to optically interact with the wide spectrum light beam 209 in FIG. 17 to extract the corresponding wavelength $\lambda_m$ produce the corresponding filtered light beam 213-$m$.

The partially assembled and completely assembled states of each gate filter optical component 218-$m$ are similar to those of each filter/lens optical component 106-$n$ shown in FIGS. 3 and 4, respectively. Except for the few differences just discussed, the element structure assembly 113 and the locking latch assembly 114 are otherwise configured and operate similar to the element structure assembly 113 and locking latch assemblies 114 in FIGS. 2 to 4 of each filter/lens optical component 106-$n$.

Refractive Lens Array 217

Referring back to FIG. 17, the refractive lens array 217 comprises MEMS refractive lens optical components 219-1 to M, as mentioned earlier. Each refractive lens optical component 219-$m$ is configured to re-focus a corresponding wavelength $\lambda_m$ to produce the corresponding individual light beam 210-$m$ with the wavelength $\lambda_m$. Like each filter/lens optical component 106-$n$ of FIGS. 2 to 4, each refractive lens optical component 219-$m$ is monolithically fabricated on the chip 104 and self assemblable on the chip 104 under the control of the control circuit 109. Furthermore, the configuration, operation, and self assembly of each refractive lens optical component 219-$m$ is similar to that of each filter/lens optical component 106-$n$ except for the differences that are discussed next.

Figure 32:
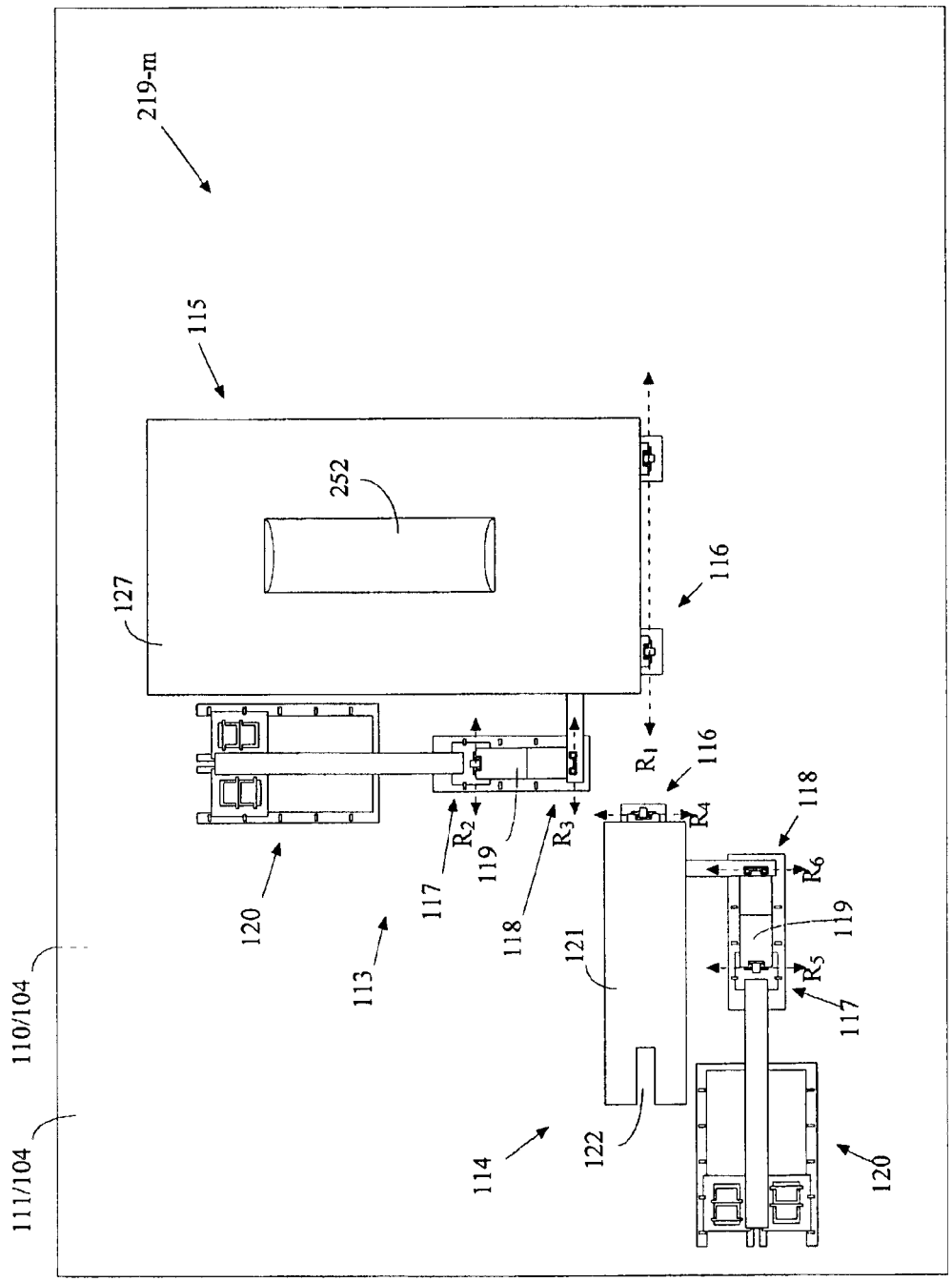
FIG. 32 shows the configuration of each refractive lens optical component of the WDM MUX/DMUX of the WDM power regulator of FIG. 17 in its unassembled state.

FIG. 32 shows the configuration of refractive lens optical component 219-$m$ in its unassembled state. Similar to each lens/filter optical component 106-$n$, each refractive lens optical component 219-$m$ comprises an element structure assembly 113 and a locking latch assembly 114. Here, however, the element structure 115 comprises a support plate 127 and a refractive lens optical element 252 formed on the support plate 127. The refractive lens optical element 252 is shaped and configured to optically interact with the corresponding filtered light beam 213-$m$ by focusing it to the attenuator array 208 of FIG. 17 as the corresponding individual light beam 210-$m$. Correspondingly, the refractive lens component 219-$m$ is configured on the chip 104 in FIG. 17 in order to accomplish this function. The slot 122 of the locking latch 121 of the locking latch assembly 114 is sized to closely receive the corresponding left or right side of the element structure 115 in the locking position of the locking latch 121.

The partially assembled and completely assembled states of each refractive lens optical component 219-$m$ are similar to those of each filter/lens optical component 106-$n$ shown in FIGS. 3 and 4, respectively. Except for the few differences just discussed, the element structure assembly 113 and the locking latch assembly 114 are otherwise configured and operate similar to the element structure assembly 113 and locking latch assemblies 114 in FIGS. 2 to 4 of each filter/lens optical component 106-$n$.

Attenuator Array 208

Referring back to FIG. 17, the attenuator array 208 comprises MEMS attenuators 255-1 to M for separately regulating the power levels of the individual light beams 210-1 to M by separately attenuating them. This produces the separately regulated light beams 211-1 to M with respective wavelengths $\lambda_1$ to $\lambda_M$ and respective regulated power levels. In doing so, each attenuator 255-$m$ is configured to regulating the power level of a corresponding individual light beam 210-$m$ by attenuating it. This results in a corresponding regulated light beam 211-$m$ with a corresponding wavelength $\lambda_m$ and corresponding regulated power level. Each attenuator 255-$m$ is monolithically fabricated on the chip 104 and is self assemblable on and reconfigurable on the chip 104 under the control of the control circuit 109. Thus, the entire attenuator array 208 is itself self assemblable on and reconfigurable on the chip 104 under the control of the control circuit 109.

Each attenuator 255-$m$ comprises a corresponding MEMS refractive lens optical component 256-$m$, a MEMS gate filter optical component 218-$m$, and a MEMS refractive lens optical component 259-$m$. The refractive lens optical component 256-$m$, the gate filter optical component 218-$m$, and the refractive lens optical component 259-$m$ are all monolithically fabricated on the chip 104 and self assemblable on the chip 104 under the control of the control circuit 109.

In its completely assembled state, the refractive lens optical component 256-$m$ is configured on the chip 104 to diverge the corresponding individual light beam 210-$m$ to produce a divergent light beam 257-$m$ with the corresponding wavelength m. The gate filter optical component 218-$m$, in its completely assembled state, allows only a portion of the divergent light beam 257-$m$ to pass through it. This attenuates the power level of the divergent light beam 257-$m$ and produces the corresponding attenuated light beam 258-$m$ with the corresponding wavelength $\lambda_m$ at the attenuated power level. In its completely assembled state, the refractive lens optical component 256-$m$ is reconfigurable under the control of the control circuit 109 in that it can be laterally moved forward and/or backward in the optical path of the corresponding individual light beam 210-$m$ to regulate the amount of the divergent light beam 257-$m$ that passes through the gate filter optical component 218-$m$. In this way, the attenuated power level of the attenuated light beam 258-$m$ can be regulated under the control of the control circuit 109. The refractive lens optical component 259-$m$, in its completely assembled state, is configured on the chip 104 to converge the attenuated light beam 258-*m*. This produces the corresponding regulated light beam 211-*m* with the corresponding wavelength $\lambda_m$ and corresponding regulated power level that was discussed earlier.

Refractive Lens Optical Component 256-*m*

FIG. 33 shows the configuration of each refractive lens optical component 256-*m* in its unassembled state. Each refractive lens optical component 256-*m* comprises a moveable stage assembly 260, an element structure assembly 113, and a locking latch assembly 114.

The moveable stage assembly 260 is configured and operates in a similar manner to the moveable stage assembly 222 of the grating mirror optical component 215 of FIGS. 18 to 21. Here, however, the moveable stage assembly 260 comprises a moveable stage 262, a guide plate 263, corresponding guiding overhangs 140, and a corresponding actuator mechanism 120. To enable the moveable stage 262 to laterally move forward and backward, the moveable stage 262, the guide plate 263, the corresponding guiding overhangs 140, and the corresponding actuator mechanism 120 are configured and operate in a similar manner to the hinge plate 130, the guide plate 139, the corresponding guiding overhangs 140, and the corresponding actuator mechanism 120 in FIGS. 10 to 16 of the element structure assembly 113 of FIGS. 2 to 4.

Figure 13:
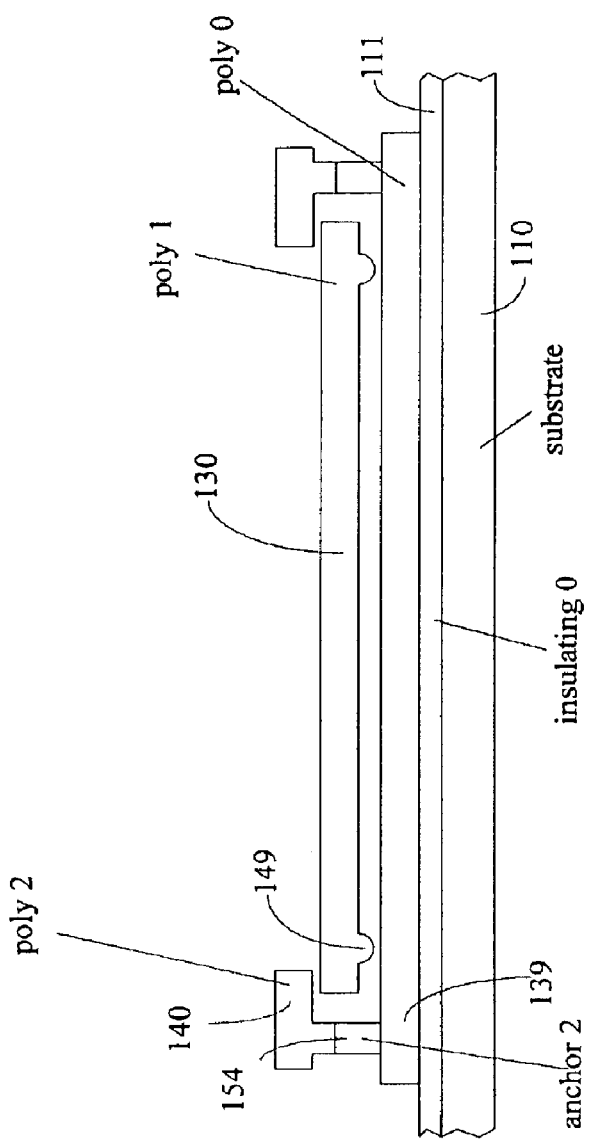

Specifically, the moveable stage 262 comprises contact rails 149 (not shown) like those of the hinge plate 130 in FIG. 13 to enable the moveable stage 262 to laterally slide on the guide plate 263 with minimal friction and stiction. Each contact rail 149 (not shown) may be continuous or may comprise a row of protrusions or bumps. The guiding overhangs 140 are fixedly coupled to the guide plate 263 with anchors 154 (not shown) and together guide the moveable stage 262 as it moves laterally on the guide plate 263. Furthermore, the moveable stage 262 is fixedly coupled to the actuator mechanism 120 with the insulating attachment bridge 141.

Similar to each refractive lens optical component 219-*m* in FIG. 33, the element structure assembly 113 of each refractive lens optical component 256-*m* comprises an element structure 115 that comprises a support plate 127 and a refractive lens optical element 265 formed on the support plate 127. Here, the refractive lens optical element 265 is shaped and configured to optically interact with the corresponding individual light beam 210-*m* in FIG. 17 by diverging it to produce the corresponding divergent light beam 257-*m*. Correspondingly, the refractive lens component 256-*m* is configured on the chip 104 in FIG. 17 in order to accomplish this function.

Furthermore, similar to the element structure assembly 113 in FIGS. 18 to 21 of the grating mirror optical component 215, the element structure assembly 113 here comprises hinges 229. The element structure 115 is pivotally coupled to the moveable stage 262 by the hinges 229 in a similar manner in which the hinges 229 in FIGS. 18 to 21 of the element structure assembly 113 pivotally couple the element structure 115 there to the moveable stage 225. The hinges 229 are each configured like that shown in FIGS. 23 to 25.

Like the moveable stage 225 of FIGS. 18 to 21, the moveable stage 262 could be crescent moon shaped with an opening that is closely sized to fit around the left and right sides of the element structure 115 and extends into the moveable structure 262 until just before the rotation hinge 226 and the hinges 229 of the element structure assembly 113. This would ensure that the portion of the support plate 127 under the refractive lens optical element 265 would be made flat during fabrication. As a result, the refractive lens optical element 265 of the grating mirror 232 would be formed on a flat surface.

The locking latch assembly 114 here also comprises hinges 229. These hinges 229 pivotally couple the locking latch 121 to the moveable stage 262. This is done in a similar manner in which the hinges 229 in FIGS. 18 to 21 of the locking latch assembly 114 of the grating mirror optical component 215 pivotally couple the locking latch 121 there to the moveable stage 225. The hinges 229 here are each also configured like that shown in FIGS. 23 to 25 except that the hinge plate 133 is fixedly coupled to the locking latch 121. The slot 122 of the locking latch 121 of the locking latch assembly 114 is sized to closely receive the corresponding left or right side of the element structure 115 in the locking position of the locking latch 121.

Figure 19:
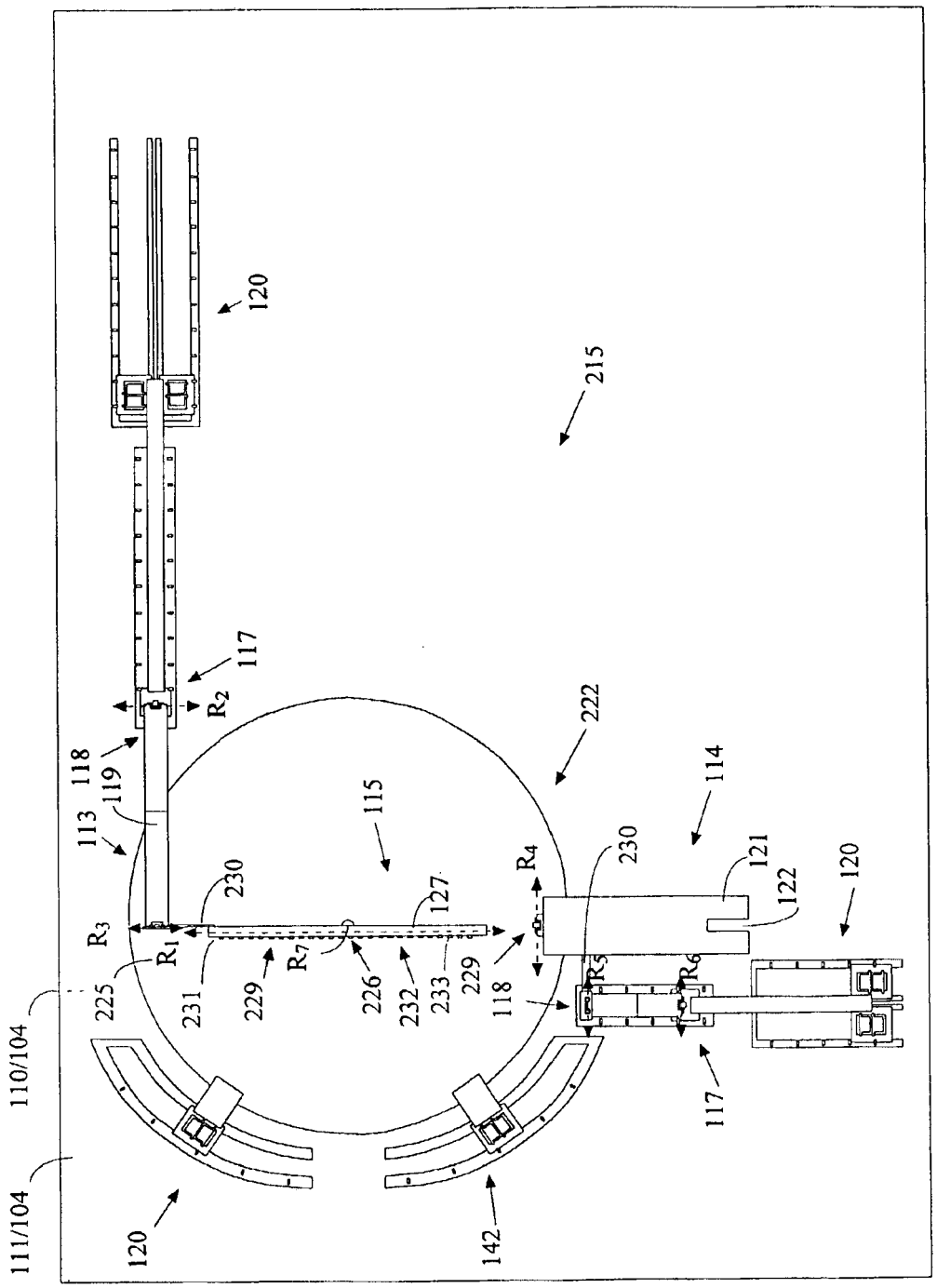
Figure 20:
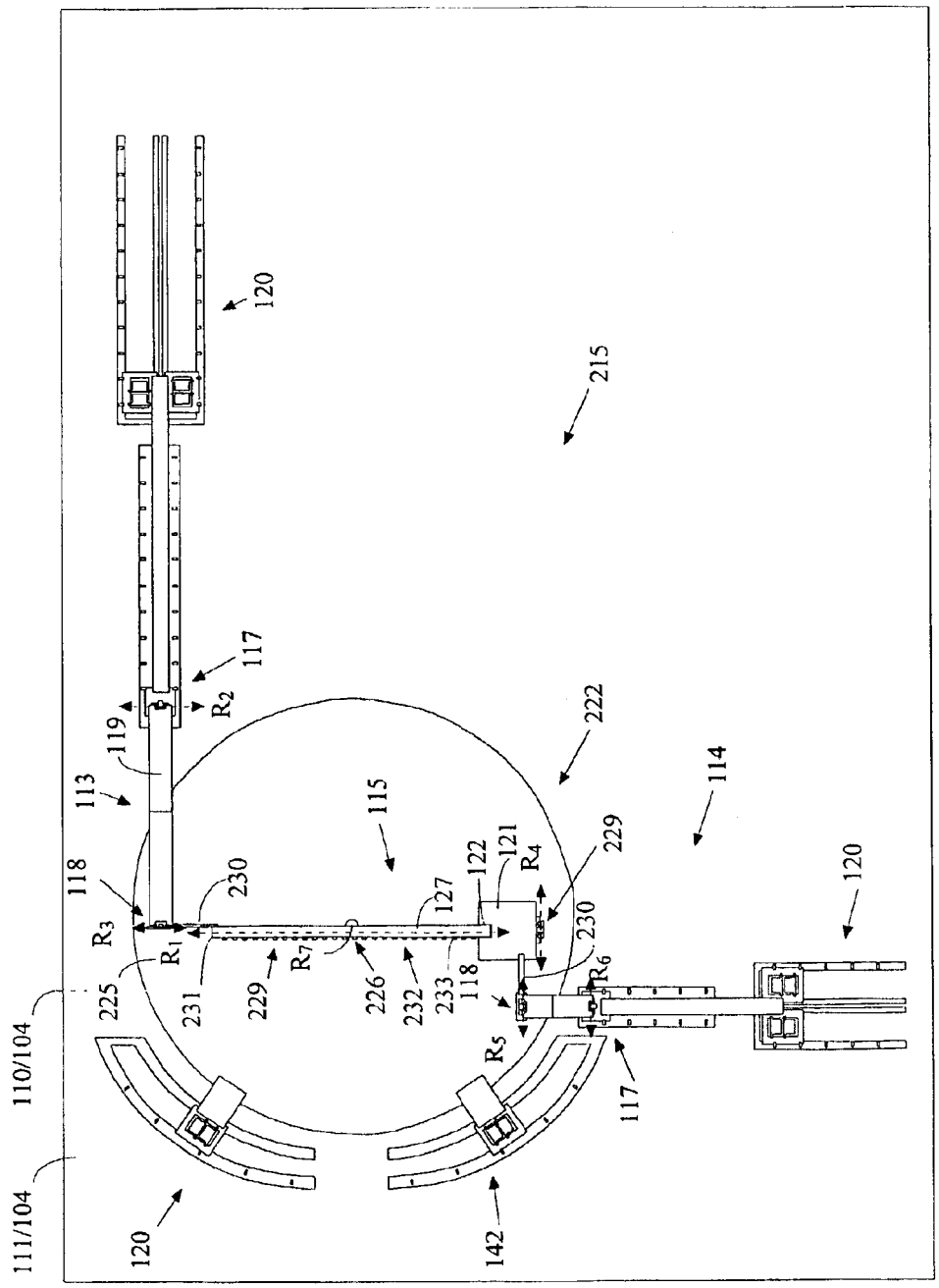

The first partially assembled, second partially assembled, and completely assembled states of each refractive lens optical component 256-*m* are similar to those of the grating mirror optical component 215 shown in FIGS. 19, 20, and 21, respectively. Here, however, the moveable stage assembly 260 is substituted for the moveable stage assembly 222 and a different element structure 115 is used. Except for the differences just discussed, the moveable stage assembly 260, the element structure assembly 113, and the locking latch assembly 114 are otherwise configured and operate similar to the moveable stage assembly 222, the element structure assembly 113, and the locking latch assembly 114 in FIGS. 18 to 21 of the grating mirror optical component 215.

As mentioned before, in its completely assembled state, the refractive lens optical component 256-*m* is reconfigurable under the control of the control circuit 109 in that it can be laterally moved forward and/or backward in the optical path of the corresponding individual light beam 210-*m* to regulate the amount of the divergent light beam 257-*m* that passes through the gate filter optical component 218-*m*. Specifically, under the control of the control circuit 109, the actuator mechanism 120 of the moveable stage assembly 260 can be controlled to move laterally forward or backward so as to cause the moveable stage 262 to move laterally forward or backward in the optical path of the corresponding individual light beam 210-*m* and properly position the element structure 115 in the optical path of the input light beam 210-*m*.

Gate Filter Optical Component 218-*m*

The configuration, operation, and self assembly of the gate filter optical component 218-*m* of each attenuator 255-*m* is similar to that described earlier for each gate filter optical component 218-*m* of the gate filter array 216 of the MUX/DMUX 207-1. Therefore, that description applies here as well to the gate filter optical component 218-*m* of each attenuator 255-*m*.

Refractive Lens Optical Component 259-*m*

Figure 34:
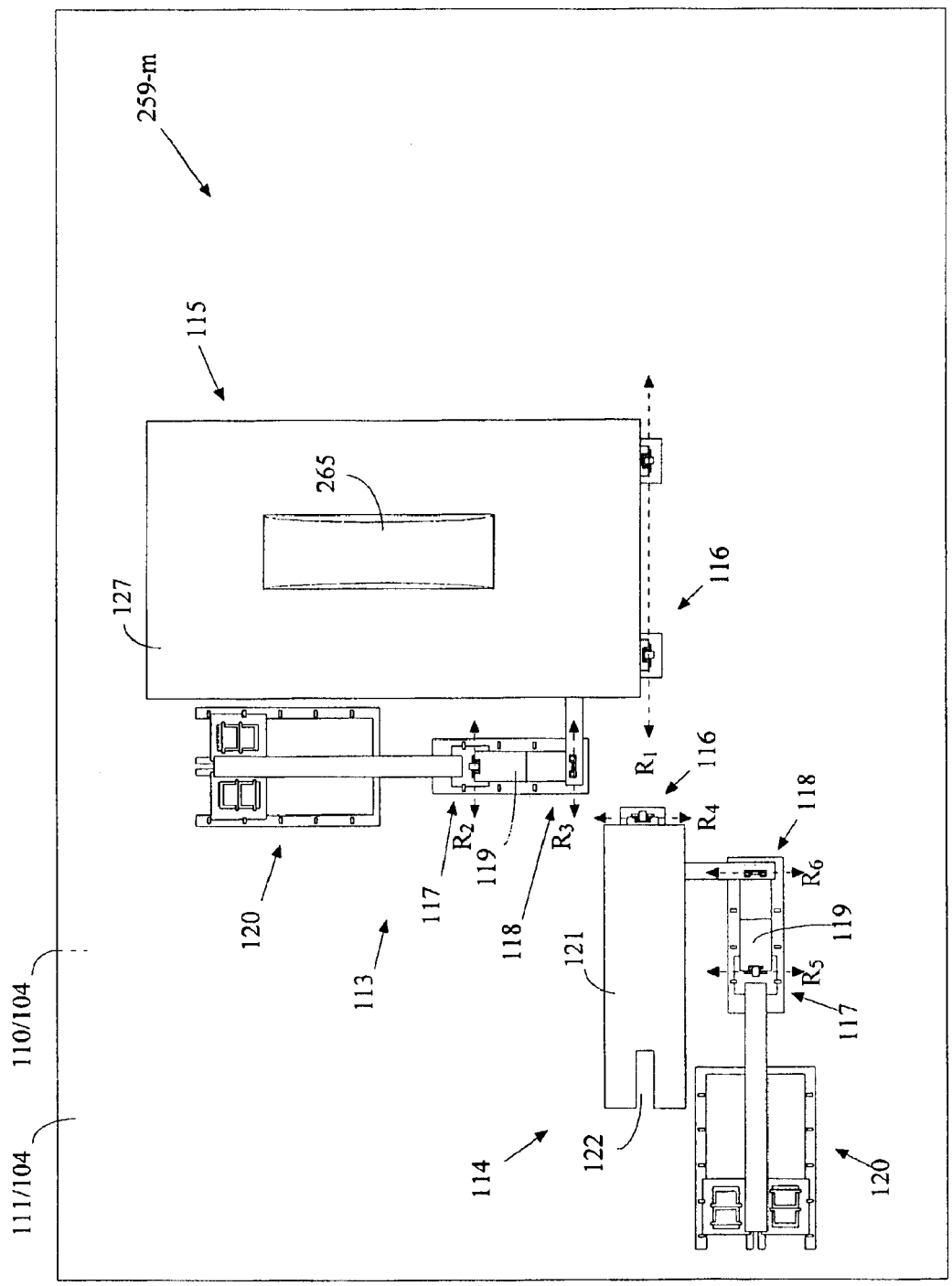
FIG. 34 shows the configuration of another refractive lens optical component of an attenuator in an attenuator array of the WDM power regulator of FIG. 17 in its unassembled state.

FIG. 34 shows the configuration of each refractive lens optical component 259-*m* of each attenuator 255-*m* in its unassembled state. Except for the differences that will be discussed next, the configuration, operation, and self assembly of the refractive lens optical component 259-*m* of each attenuator 255-*m* is similar to that described earlier for each refractive lens optical component 219-*m* in FIG. 32 of the refractive lens array 217 of FIG. 17.

The refractive lens optical component 259-*m* comprises an element structure 115 like that shown in FIG. 33 for the refractive lens optical component 256-*m*. The refractive lens optical element 265 is shaped for converging the corresponding attenuated light beam 258-*m* to produce the corresponding regulated light beam 211-*n*. Correspondingly, the refractive lens component 259-*m* is configured on the chip 104 in FIG. 17 in order to accomplish this function.

Alternative Configuration

Figure 35:
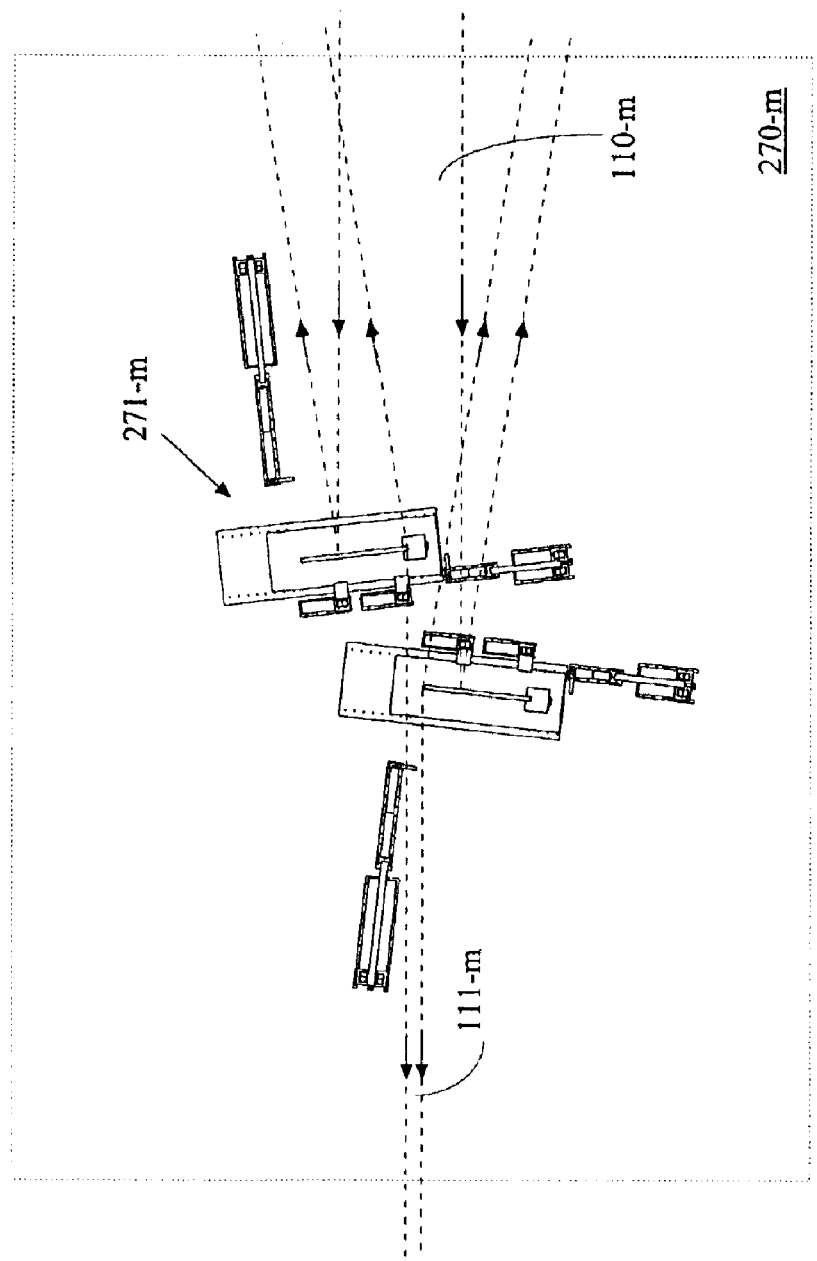
FIG. 35 shows the alternative configuration of an attenuator for the attenuator array of the WDM power regulator of FIG. 17.

In alternative configuration for the attenuator array 208 of FIG. 17, each MEMS attenuator 255-*m* may be replaced by a corresponding attenuator 270-*m* of FIG. 35. Like each attenuator 255-*m*, each attenuator 270-*m* is configured to regulating the power level of a corresponding individual light beam 210-*m* by attenuating it. This results in a corresponding regulated light beam 211-*m* with a corresponding wavelength $\lambda_m$ and corresponding regulated power level. Each attenuator 270-*m* is monolithically fabricated on the chip 104 and is self assemblable on and reconfigurable on the chip 104 under the control of the control circuit 109.

Each attenuator 270-*m* comprises two corresponding MEMS light blocking optical components 271-*m*. These light blocking optical components 271-*m* are monolithically fabricated on the chip 104 and self assemblable on the chip 104 under the control of the control circuit 109.

The light blocking optical components 271-*n* are oriented and configured on the chip 104 to be on opposite sides of the optical path of the corresponding individual light beam 210-*m*. This provides a gap between the light blocking optical components 271-*m*. The portion of the corresponding individual light beam 210-*m* that passes through the gap between the light blocking optical components 271-*m* is the corresponding regulated light beam 211-*m* with the corresponding wavelength $\lambda_m$ at the regulated power level. The corresponding amount of the individual light beam 210-*m* that passes through the gap can be regulated under the control of the control circuit 109 to regulate the power level of the regulated light beam 211-*m*. This is done by regulating the size of the gap.

Specifically, in its completely assembled state, each light blocking optical component 271-*m* is reconfigurable under the control of the control circuit 109 in that it can be laterally moved forward and/or backward to intersect the optical path of the corresponding individual light beam 210-*m*. For example, when both of the light blocking optical components 271-*m* are laterally moved forward in their respective forward directions, the size of the gap is made smaller. Conversely, when both of the light blocking optical components 271-*m* are laterally moved backward in their respective backward directions, the size of the gap is made larger. This results in one portion of the individual light beam 210-*m* passing through the gap to form the regulated light beam 211-*m* while respective other portions of the individual light beam 210-*m* are blocked from passing by the light blocking optical components 271-*m*.

Moreover, as shown in FIG. 35, each light blocking optical component 271-*m* is oriented on the chip 104 so as to intersect the optical path of the individual light beam 210-*m* at a titled angle normal (i.e., perpendicular) to the optical path. This is done to prevent the blocked portions of the individual light beam 210-*m* from being redirected in the opposite direction along the optical path of the individual light beam 210-*m* and being reflected and redirected back to the optical input source 201 of FIG. 17 via the preceding optical components 213-*m*, 218-*m*, and 215.

Finally, as those skilled in the art will recognize, one or more of the light blocking optical components 271-*m* can be used to regulate the power level of a corresponding individual light beam 210-*m* by attenuating it. Furthermore, the attenuator 270-*m* could be used to attenuate a light beam that includes more than just one wavelength. For example, it could be used to attenuate the input light beam 205 of FIG. 17.

Light Blocking Optical Component 271-*m*

Figure 36:
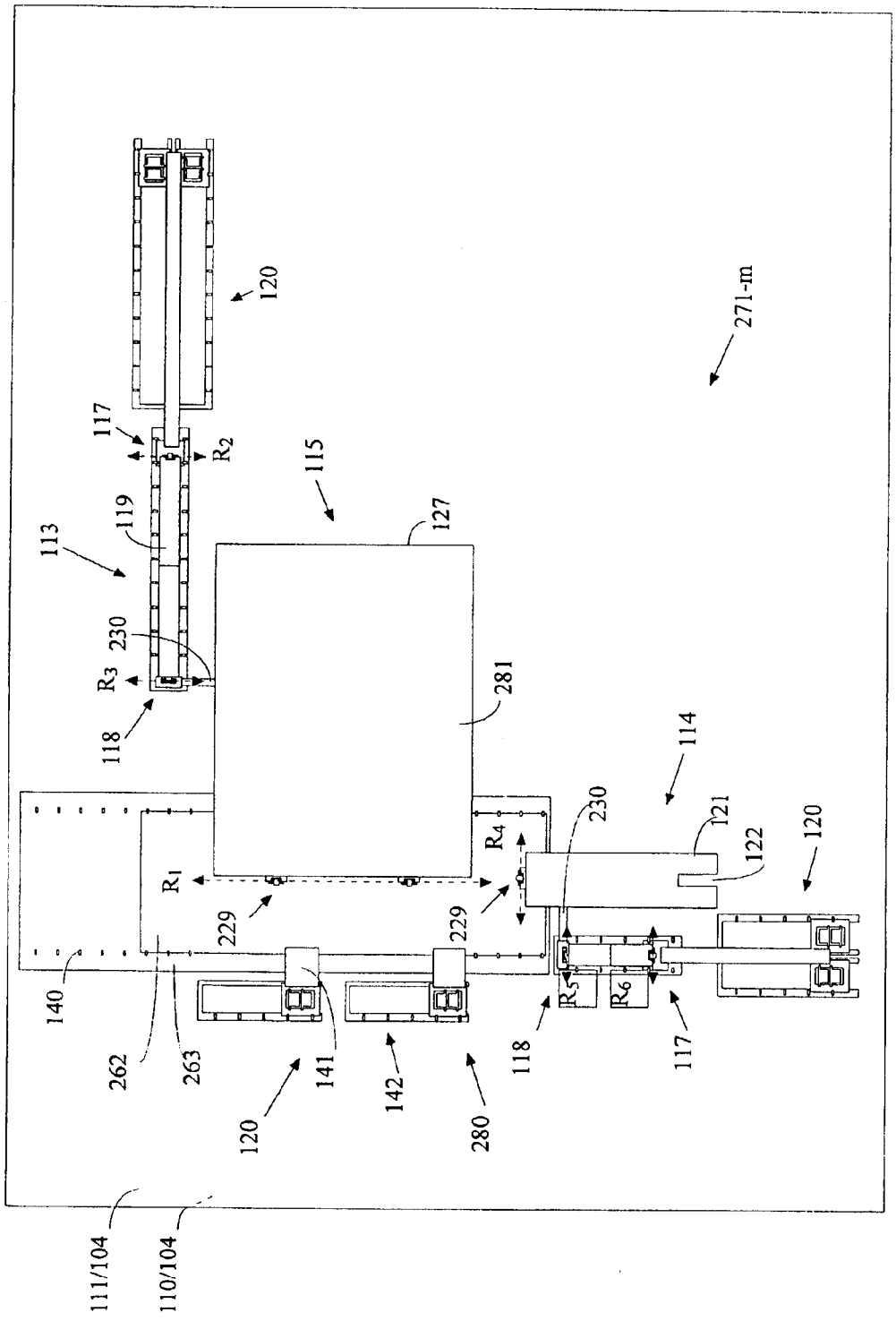
FIG. 36 shows the configuration of each light blocking optical component of the attenuator of FIG. 35.

FIG. 36 shows the configuration of each light blocking optical component 271-*m* in its unassembled state. Each light blocking optical component 271-*m* comprises a moveable stage assembly 280, an element structure assembly 113, and a locking latch assembly 114.

The moveable stage assembly 280, the element structure assembly 113, and the locking latch assembly 114 of the light blocking optical component 271-*m* are configured and operate in a similar manner to the moveable stage assembly 260, the element structure assembly 113, and the locking latch assembly 114 of the refractive lens refractive lens optical component 256-*m* of FIG. 33. Thus, except for the differences mentioned next, the earlier discussion of the moveable stage assembly 260, the element structure assembly 113, and the locking latch assembly 114 of the refractive lens refractive lens optical component 256-*m* is also applicable here as well.

Here, the moveable stage 262 of the moveable stage assembly 280 moves laterally forward and backward in perpendicular directions to the moveable stage 262 of the moveable stage assembly 260 of FIG. 33. This means that the moveable stage 262 laterally slides on the guide plate 263 in these directions on its contact rails 149 (not shown). And, the guiding overhangs 140 are fixedly coupled to the guide plate 263 with anchors 154 (not shown) to together guide the moveable stage 262 as it moves laterally on the guide plate 263 in these directions.

Like the actuator mechanism 120 of the moveable stage assembly 260 of FIG. 33, the actuator mechanism 120 of the moveable stage assembly 280 comprises two actuator sub-mechanisms 142 so that the actuator mechanism 120 can be controlled to move laterally forward or backward. Thus, one actuator sub-mechanism 142 is configured for lateral forward movement and the other is configured for lateral backward movement. Here, however, each actuator sub-mechanism 142 includes a corresponding insulating attachment bridge 141 that fixedly couples the support frame 143 of the actuator sub-mechanism 142 to the moveable stage 262. Furthermore, one actuator sub-mechanism 142 is configured for lateral forward movement and the other is configured for lateral backward movement.

Similar to each refractive lens optical component 256-*m* in FIG. 33, the element structure assembly 113 of each light blocking optical component 271-*m* comprises an element structure 115 that itself comprises a support plate 127. However, here, the element structure 115 also comprises a light blocking optical element 281 formed on the support plate 127. Here, the light blocking optical element 281 is aligned and configured to optically interact with the corresponding individual light beam 210-*m* in FIG. 35 by intersecting its optical path and blocking a portion of it from passing through the gap formed between the two light blocking optical components 271-*m*. The light blocking optical element 281 of each light blocking optical component 271-*m* comprises a metal plate to reflect the blocked portion of the light beam 210-*m*. This metal plate is similar to the metal plate 231 of FIG. 22 of each grating mirror optical element 215, except that it does not have vertical metal strips 233. Alternatively, the light blocking optical element 281 may comprise a plate of a light absorbing material to absorb the blocked portion of the light beam 210-*m*. The portion of the individual light beam 210-*m* that passes through the gap forms the regulated light beam 211-*m*. Correspondingly, each light blocking optical component 271-*m* is configured on the chip 104 in FIG. 17 in order to accomplish this function.

The first partially assembled, second partially assembled, and completely assembled states of each light blocking optical component 271-*m* are similar to those discussed earlier for each refractive lens optical component 256-*m* of FIG. 33. Here, however, the moveable stage assembly 280 is substituted for the moveable stage assembly 260. Moreover, except for the differences just discussed, the moveable stage assembly 280, the element structure assembly 113, and the locking latch assembly 114 are otherwise configured and operate similar to the moveable stage assembly 260, the element structure assembly 113, and the locking latch assembly 114 of each refractive lens optical component 256-*m*.

As mentioned before, in its completely assembled state, each light blocking optical component 271-*m* is reconfigurable under the control of the control circuit 109 for being laterally moved forward and/or backward. As alluded to earlier, this is done in order to regulate the amount of the individual light beam 110-*m* that passes through the gap shown in FIG. 35 between the light blocking optical components 271-*m*. More specifically, under the control of the control circuit 109, each actuator sub-mechanism 142 of the actuator mechanism 120 of the moveable stage assembly 280 can be controlled to move correspondingly laterally forward or backward. This causes the moveable stage 262 to move correspondingly laterally forward or backward so that the element structure 115 is also moved correspondingly laterally forward or backward. Referring to FIG. 35, this results in a corresponding size for the gap between the element structures 115 of the element structure assemblies 113 of the two light blocking optical components 271-*m*. In other words, the size of the gap can be easily regulated.

MUX/DMUX 207-2

Referring back to FIG. 17, in contrast to the MUX/DMUX 207-1, the MUX/DMUX 207-2 is configured on the chip 104 and used in the optical network 200 for multiplexing. The MUX/DMUX 207-2 has otherwise the same configuration and self-assembly as the MUX/DMUX 207-1. Furthermore, the operation of the MUX/DMUX 207-2 in the optical network 100 is the reciprocal of that discussed for the MUX/DMUX 207-1.

Fabrication Process

The WDM power regulator 203 may be fabricated using a three polysilicon layer process. This of course also means that the MUX/DMUXs 207-1 and 207-2, the attenuator array 208, the grating mirror optical component 215, the gale filter array 216, the refractive lens array 217, each attenuator 255-*m*, each gate filter optical component 218-*m*, each refractive lens optical component 219-*m*, each refractive lens optical component 256-*m*, each refractive lens optical component 259-*m*, and each attenuator 270-*m* may each be formed with this same three polysilicon layer process.

This three polysilicon layer process is similar to that described earlier for the MUX/DMUX 103. In fact, the formation of elements with the same reference numerals as in the MUX/DMUX 103 will be the same. As a result, only the differences in the three polysilicon layer process with respect to formation of new elements will be discussed next.

Here, the first polysilicon layer (poly 0) is further selectively patterned on the insulating layer 111 to form the guide strip 241 in FIG. 30 of each moveable stage assembly 222, the lower bracket 235 in FIG. 28 of each rotation hinge 226, and the guide plate 263 in FIG. 33 of each moveable stage assembly 260.

The first sacrificial layer is further selectively etched to form dimples in the first sacrificial layer for forming the contact rail 242 in FIG. 30 of each moveable stage 225 and the rails 149 (not shown) of each moveable stage 262 in FIG. 33. Furthermore, the first sacrificial layer is also selectively etched down to the lower bracket 235 in FIG. 28 of each rotation hinge 226 and down to the guide plate 263 in FIG. 33 of each moveable stage assembly 260 to form openings in the first sacrificial layer for the anchor 154 of each rotation hinge 226 and the anchors 154 (not shown) for the guiding overhangs 140 of each moveable stage assembly 260.

The second polysilicon layer (poly 1) is further deposited in the openings just mentioned. The second polysilicon layer is then further selectively patterned to form the lower portion of the anchors just mentioned, the middle section 236 in FIG. 28 of each rotation hinge 226, the moveable stage 225 in FIGS. 28 and 30 including the contact rail 242, the moveable stage 262 in FIG. 33 including the contact rails 149 (not shown), the hinge plate 130 in FIGS. 23 to 25 of each hinge 229, and the support arm 230 in FIGS. 26 and 27 of each element structure assembly 113 and each locking latch assembly 114.

Figure 26:
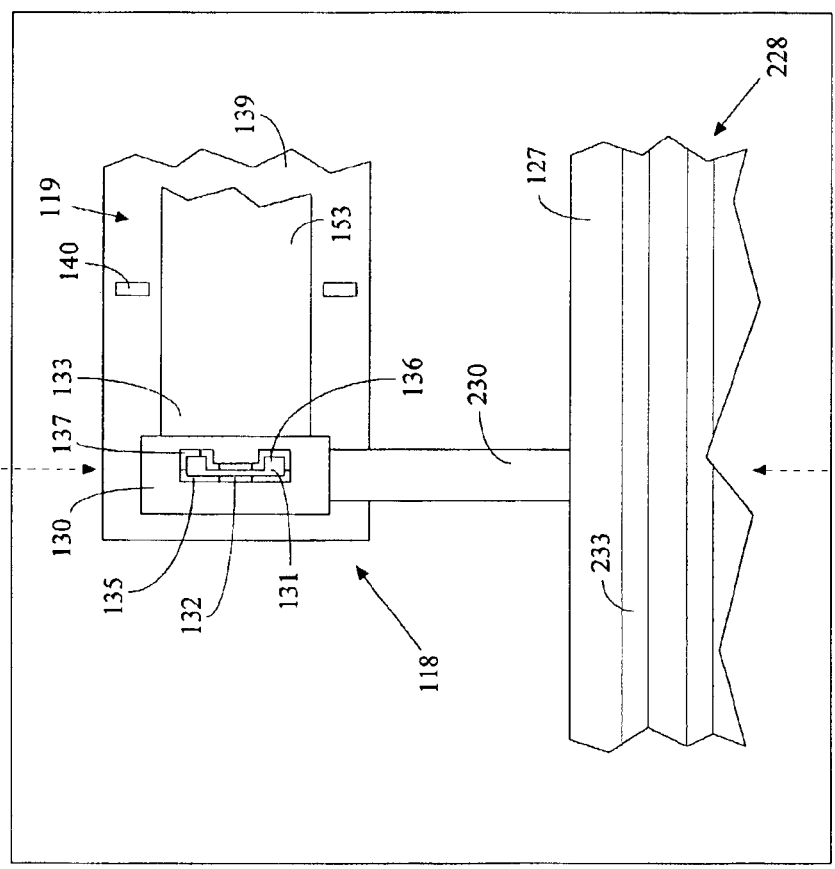
FIGS. 26 and 27 show the configuration of an additional support arm of the element structure assembly of the grating mirror optical component of FIGS. 18 to 21.
Figure 27:
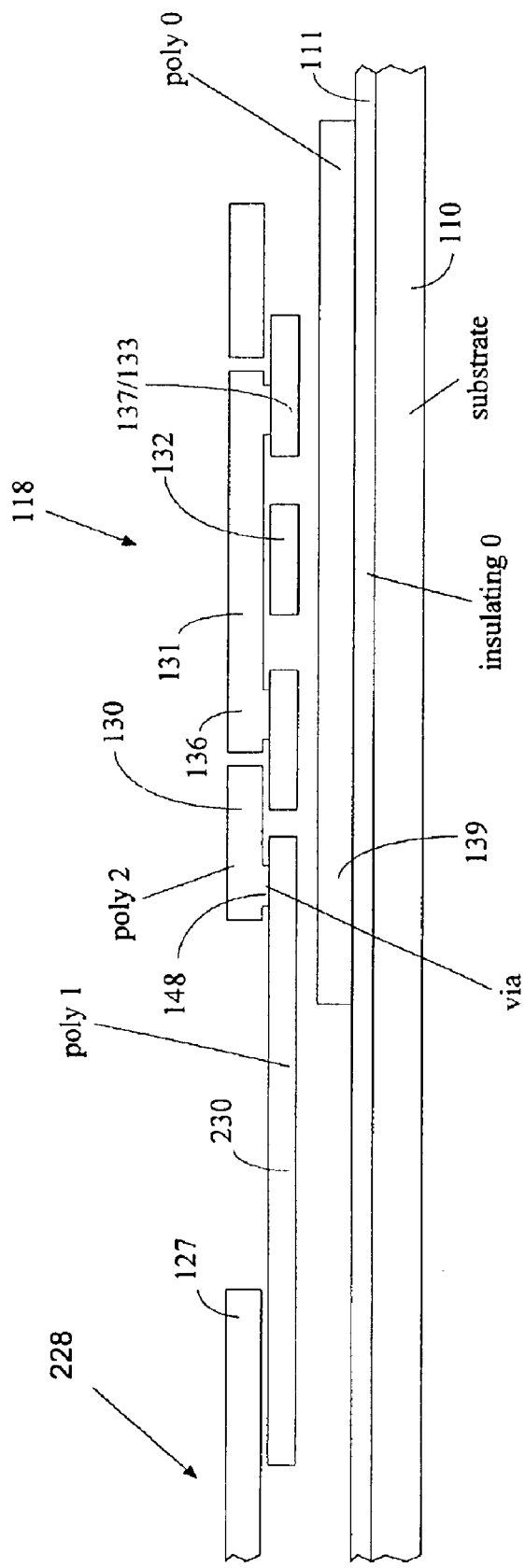

The second sacrificial layer is further selectively etched down to the support arm 230 in FIGS. 26 and 27 of each element structure assembly 113 and each locking latch assembly 114 and down to the hinge plate 130 in FIGS. 23 to 25 of each hinge 229 to form openings for the corresponding vias 148. The second sacrificial layer is also selectively etched down to the lower portions of the anchor 154 in FIGS. 24 and 25 of each rotation hinge 226 and the anchors 154 (not shown) in FIG. 33 of each moveable stage assembly 260 to form openings for the upper portions of these anchors 154.

The third polysilicon layer (poly 2) is further deposited in the openings just mentioned. The third polysilicon layer is then further selectively patterned to form the upper portions of the anchors 154 just mentioned, the vias 148 just mentioned, the upper bracket 237 of each rotation hinge 226, the hinge plate 133 and locking arm 132 in FIGS. 23 to 25 of each hinge 229, and the guiding overhangs 140 in FIG. 33 of each moveable stage assembly 260. The third polysilicon layer (poly 2) is further selectively patterned to form the slot 248 in FIG. 31 in the support plate 127 of the element structure 115 of each gate filter optical component 218-*m*.

The third sacrificial layer is further selectively etched down to the support plate 127 in FIG. 22 of the element structure 115 of each grating mirror optical component 215 and down to the support plate of FIG. 36 of the element structure of each light blocking optical component 271-*n*. This is down so as to form openings for the formation of the metal strips 233 of each grating mirror optical component 215 and the metal plate of the light blocking optical element 281 of each light blocking optical component 271-*m*.

Then, a metal layer, such as gold, is deposited on the third sacrificial layer in the openings just mentioned. The metal layer is then selectively patterned to form the metal plate 231 and the metal strips 233 of each grating mirror optical component 215 and the metal plate of the light blocking optical element 281 of each light blocking optical component 271-*n*.

The third sacrificial layer is then further selectively etched down to the support plates 127 in FIGS. 32 to 34 of the element structures 115 of each refractive lens optical component 219-*m*, 256-*m*, and 259-*m* to form openings for the formation of the refractive lens optical elements 252 and 265.

Then, a lens forming layer, such as a polyamide (i.e., a photoresist), silicon nitride, or polysilicon (i.e., a fourth polysilicon layer (poly 3)), is then deposited on the third sacrificial layer and in the openings just mentioned. This layer is then patterned to form the lenses 252 and 265 just mentioned.

Finally, the first, second, and third sacrificial layers are removed. This frees all of the hinges 116, 117, 118, 226, and 229, the element structures 115, the locking latchs 121, the moveable stages 225, the moveable stages 262, support arms 230, and the actuator mechanisms 120 in FIGS. 18 to 21 and 31 to 34 for movement in the manner described earlier.

CONCLUSION

The present invention may be embodied as any optical network, such as the optical network 100 of FIG. 1 and/or the network 200 of FIG. 17, that comprises one or more optical input sources and one or more optical output collectors, such as the optical input source 101 and/or the optical output collectors 102-1, 2, 3, 4, ..., N of FIG. 1 and/or the optical input source 201 and/or the optical output collector 202 of FIG. 17, and an optical device, such as the MUX/DMUX 103 of FIG. 1, the WDM power regulator 203 of FIG. 17, the MUX/DMUXs 207-1 and 207-2 of FIG. 17, the attenuator 255-$m$ of FIG. 17, and/or the attenuator 270-$m$ of FIG. 35, that is optically coupled between the optical input sources and the optical output collectors and is integrated on an integrated MEMS chip, such as chip 104 of FIG. 1 or FIG. 17. The optical device could additionally be or comprise a switch, a filter apparatus, a wavemeter, a power regulator, an attenuator, and/or some other optical device.

The optical device includes one or more monolithically fabricated, on-chip assemblable, MEMS optical components, such as the filter/lens optical component 105 of FIG. 1, the filter/lens optical components 106-$n$ of FIGS. 2 to 4, the grating mirror optical component 215 of FIGS. 18 to 21, the gate filter optical component 218-$m$ of FIG. 31, the refractive lens optical component 219-$m$ of FIG. 32, the refractive lens optical component 256-$m$ of FIG. 33, the refractive lens optical component 259-$m$ of FIG. 34, and the light blocking optical component 271-$m$ of FIG. 36, integrated on the chip in accordance with the invention. These optical components could comprise one or more of a filter, mirror, lens, tuning plate, and/or some other optical component.

Furthermore, some of the elements of the optical components 105, 106-$n$, 215, 218-$m$, 219-$m$, 256-$m$, 259-$m$, and 271-$m$ described herein can be used in other applications. For example, the hinges 116, 117, 118, 226, and 229, the support arms 119, and the actuator mechanisms 120 can be used in quasi-optical systems and RF devices, as disclosed in copending PCT Patent Applications Ser. Nos. PCT/US00/16024 and PCT/US00/16021 referenced earlier.

Finally, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A MEMS attenuator formed on an integrated MEMS chip for regulating the power level in an individual light beam to produce a regulated light beam, the MEMS attenuator comprising at least one light blocking optical component, each light blocking optical component comprising:
   a moveable stage assembly comprising:
      a moveable stage;
      a guide plate formed on the integrated MEMS chip on which the moveable stage can laterally slide; and
      an actuator mechanism formed on the integrated MEMS chip and moveably coupled to the moveable stage, the corresponding actuator mechanism being configured to be controlled to move laterally on the integrated MEMS chip so as to cause the moveable stage to laterally slide on the guide plate; and
   an element structure on the moveable stage comprising:
      a support plate; and
      a light blocking optical element formed on the support plate, the light blocking optical element being aligned for intersection of the individual light beam;
   wherein the power level of the individual light beam is regulated by controlling the actuator mechanism to move laterally so that the light blocking optical element intersects the individual light beam a corresponding amount and blocks a corresponding portion of the individual light beam from passing.

2. The MEMS attenuator of claim 1 wherein each of the light blocking optical elements is self-assemblable on the integrated MEMS chip.

3. The MEMS attenuator of claim 2 wherein the at least one light blocking optical elements are monolithiocally fabricated on the integrated MEMS chip.

4. The MEMS attenuator of claim 1 wherein the at least one light blocking optical component comprises two light blocking optical components oriented on the integrated MEMS chip on opposing sides of the optical path of the individual light beam.

5. The MEMS attenuator of claim 1 wherein each of the light blocking optical components is oriented on the integrated MEMS chip so as to intersect the optical path of the individual light beam at a titled angle normal to the optical path.

* * * * *